US010497392B2

(12) United States Patent
Nakamura et al.

(10) Patent No.: US 10,497,392 B2
(45) Date of Patent: Dec. 3, 2019

(54) DISK HOLDER FOR DISK CARTRIDGE

(71) Applicant: SONY CORPORATION, Tokyo (JP)

(72) Inventors: Takuji Nakamura, Kanagawa (JP); Jiro Fujiwara, Tokyo (JP); Takashi Yamamoto, Tokyo (JP); Satoshi Moriyama, Kanagawa (JP); Masaya Orime, Kanagawa (JP); Hideki Yoneoka, Kanagawa (JP); Kiyoshi Yamauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/085,270

(22) PCT Filed: Feb. 6, 2017

(86) PCT No.: PCT/JP2017/004234
§ 371 (c)(1),
(2) Date: Sep. 14, 2018

(87) PCT Pub. No.: WO2017/163632
PCT Pub. Date: Sep. 28, 2017

(65) Prior Publication Data
US 2019/0080714 A1    Mar. 14, 2019

(30) Foreign Application Priority Data
Mar. 23, 2016 (JP) .................................. 2016-059223

(51) Int. Cl.
*G11B 17/043*    (2006.01)
*G11B 17/26*    (2006.01)
(Continued)

(52) U.S. Cl.
CPC .......... *G11B 17/043* (2013.01); *G11B 17/041* (2013.01); *G11B 17/0434* (2013.01);
(Continued)

(58) Field of Classification Search
CPC ..... G11B 17/043; G11B 25/043; G11B 17/26; G11B 23/0301
See application file for complete search history.

(56) References Cited

U.S. PATENT DOCUMENTS

| 8,281,327 B2* | 10/2012 | Goto | ................... | G11B 17/223 |
| | | | | 369/30.83 |
| 8,321,880 B2* | 11/2012 | Takasawa | .......... | G11B 23/0323 |
| | | | | 369/30.53 |

(Continued)

FOREIGN PATENT DOCUMENTS

| CN | 102063921 A | 5/2011 |
| CN | 102270477 A | 12/2011 |

(Continued)

OTHER PUBLICATIONS

International Search Report and Written Opinion of PCT Application No. PCT/JP2017/004234, dated Apr. 18, 2017, 8 pages of ISRWO.

*Primary Examiner* — Brian E Miller
(74) *Attorney, Agent, or Firm* — Chip Law Group

(57) ABSTRACT

To improve general versatility regarding a disk cartridge. A disk conveyor apparatus includes: a disk holder that holds at least a part of a disk cartridge in which disk-shaped recording media are accommodated inside a case body in a state where the disk-shaped recording media are accommodated, and is moved in at least a direction of a center axis of the disk-shaped recording media; a movement mechanism that causes the disk holder to move in the direction of the center axis of the disk-shaped recording media; and a feeder mechanism that feeds the disk-shaped recording media toward a disk drive apparatus from the case body, the disk holder being capable of holding different types of disk cartridges, a movement position of the disk holder being set (Continued)

by operating the movement mechanism in accordance with the type of the disk cartridge.

16 Claims, 27 Drawing Sheets

(51) Int. Cl.
*G11B 25/04* (2006.01)
*G11B 17/041* (2006.01)
*G11B 17/22* (2006.01)
*G11B 23/03* (2006.01)

(52) U.S. Cl.
CPC ............ *G11B 17/223* (2013.01); *G11B 17/26* (2013.01); *G11B 25/043* (2013.01); *G11B 23/0301* (2013.01)

(56) References Cited

U.S. PATENT DOCUMENTS

| | | | | |
|---|---|---|---|---|
| 8,356,312 B2* | 1/2013 | Takasawa | ............ | G11B 17/223 369/30.83 |
| 8,589,961 B2* | 11/2013 | Takasawa | .......... | G11B 23/0323 369/30.68 |
| 8,695,024 B2* | 4/2014 | Yoshida | ................ | G11B 17/30 720/615 |
| 8,793,712 B2* | 7/2014 | Goto | .................... | G11B 17/223 720/615 |
| 8,984,544 B2* | 3/2015 | Goto | .................... | G11B 17/225 720/615 |
| 2007/0044112 A1* | 2/2007 | Lin | ......................... | G11B 17/30 720/615 |
| 2007/0130579 A1* | 6/2007 | Owens | .................... | G11B 17/22 720/718 |
| 2011/0225602 A1 | 9/2011 | Kubo et al. | | |
| 2011/0296445 A1* | 12/2011 | Takasawa | ............ | G11B 17/223 720/606 |
| 2011/0296446 A1 | 12/2011 | Takasawa et al. | | |
| 2019/0080714 A1* | 3/2019 | Nakamura | ............ | G11B 17/043 |

FOREIGN PATENT DOCUMENTS

| | | |
|---|---|---|
| EP | 2323133 A2 | 5/2011 |
| JP | 2006-073104 | 3/2006 |
| JP | 2006-073104 A | 3/2006 |
| JP | 2011-108313 A | 6/2011 |
| JP | 2011-248973 A | 12/2011 |
| JP | 2012-009122 A | 1/2012 |
| KR | 10-2011-0053913 A | 5/2011 |
| TW | 201140569 A | 11/2011 |

* cited by examiner

DISK HOLDER FOR DISK CARTRIDGE

CROSS REFERENCE TO RELATED APPLICATIONS

This application is a U.S. National Phase of International Patent Application No. PCT/JP2017/004234 filed on Feb. 6, 2017, which claims priority benefit of Japanese Patent Application No. JP 2016-059223 filed in the Japan Patent Office on Mar. 23, 2016. Each of the above-referenced applications is hereby incorporated herein by reference in its entirety.

TECHNICAL FIELD

The present technology relates to a technical field of a disk conveyor apparatus that handles a disk cartridge in which disk-shaped recording media are accommodated inside a case body and conveys the disk-shaped recording media.

CITATION LIST

Patent Literature

Patent Literature 1: Japanese Patent Application Laid-open No. 2012-9122
Patent Literature 2: Japanese Patent Application Laid-open No. 2011-248973

BACKGROUND ART

For example, some disk cartridges include a case body and a plurality of disk-shaped recording media, and the plurality of disk-shaped recording media are accommodated inside the case body while being arranged side by side in a thickness direction. Regarding such disk cartridges, the disk-shaped recording media are conveyed by a disk conveyor apparatus along a predetermined path.

For example, the disk conveyor apparatus conveys the disk-shaped recording media between a holding position where the disk cartridge is held by a disk holder or a tray and a recording/reproducing position where information signals of image data, audio data, and the like are recorded and reproduced.

In the disk conveyor apparatus as described above, for example, a desired disk-shaped recording medium is taken out from the plurality of disk-shaped recording media accommodated in the disk cartridge and conveyed to the recording/reproducing position by a conveyor mechanism, and the disk-shaped recording medium for which recording and reproduction of information signals have ended is conveyed from the recording/reproducing position by the conveyor mechanism to be accommodated in the case body (see, for example, Patent Literature 1 and Patent Literature 2).

The disk conveyor apparatuses described in Patent Literature 1 and Patent Literature 2 include a disk holder that holds the disk cartridge, a movement mechanism such as a slider, that moves the disk holder in a direction of a center axis of the disk-shaped recording medium, and a feeder mechanism (discharge lever) that feeds the disk-shaped recording medium toward a disk drive apparatus from the case body. The disk cartridge includes a first shell and a second shell that are separable in a vertical direction, and the plurality of disk-shaped recording media are held by the second shell. The disk holder is constituted of a separable upper holder and lower holder.

When the disk cartridge is inserted into a cartridge insertion/ejection port and held by the disk holder, the first shell and the second shell are unlocked so that the first shell and the second shell become separable. When the first shell and the second shell are unlocked, the lower holder is moved downward to a predetermined position together with the second shell.

When the lower holder is moved downward to the predetermined position, the feeder mechanism is operated (rotated), and one of the plurality of disk-shaped recording media held by the lower holder is fed toward the disk drive apparatus.

DISCLOSURE OF INVENTION

Technical Problem

Incidentally, in recent years, types and recording capacity of the disk-shaped recording media are apt to increase, and an amount of data that needs to be recorded is also increasing along with a spread of cloud computers and the like. Under such circumstances, various types of disk cartridges have prevailed, and there are various numbers of disk-shaped recording media to be accommodated, thicknesses, and recording capacities.

In a situation where the number, thickness, and the like of the disk-shaped recording media to be accommodated differ, for example, in a case where an outer shape of the case body and a size thereof are the same, a distance (pitch) between the accommodated disk-shaped recording media in the thickness direction differs depending on the type of the disk cartridge.

However, when manufacturing disk conveyor apparatuses that respectively support these different types of disk cartridges, manufacturing costs increase, and thus development of a general-purpose disk conveyor apparatus is desired.

In this regard, a disk conveyor apparatus according to the present technology aims at overcoming the problems described above and improving general versatility of a disk cartridge.

Solution to Problem

First, to solve the problems described above, a disk conveyor apparatus according to the present technology includes: a disk holder that holds at least a part of a disk cartridge in which disk-shaped recording media are accommodated inside a case body in a state where the disk-shaped recording media are accommodated, and is moved in at least a direction of a center axis of the disk-shaped recording media; a movement mechanism that causes the disk holder to move in the direction of the center axis of the disk-shaped recording media; and a feeder mechanism that feeds the disk-shaped recording media toward a disk drive apparatus from the case body, the disk holder being capable of holding different types of disk cartridges, a movement position of the disk holder being set by operating the movement mechanism in accordance with the type of the disk cartridge.

Accordingly, the movement position of the disk holder is set by the operation of the movement mechanism corresponding to the type of the disk cartridge held by the disk holder.

Second, it is desirable for the disk conveyor apparatus according to the present technology to further include: an identification unit that identifies the type of the disk cartridge; and a control unit that controls the movement mechanism, and the control unit to control the movement position of the disk holder on a basis of an identification result of the identification unit.

Accordingly, the movement mechanism is operated under control of the control unit on the basis of the identification result of the identification unit.

Third, it is desirable for the disk conveyor apparatus according to the present technology to further include: an identification unit that identifies the type of the disk cartridge and specific information for specifying at least one of the disk-shaped recording media accommodated in the disk cartridge; and a control unit that controls the movement mechanism, and the control unit to control the movement position of the disk holder on a basis of an identification result of the identification unit.

Accordingly, the movement mechanism is operated under control of the control unit on the basis of the identification result including the specific information of the identification unit.

Fourth, in the disk conveyor apparatus according to the present technology, it is desirable for the feeder mechanism to feed the disk-shaped recording media toward the disk drive apparatus from the case body in a state where the disk holder is moved to the set movement position.

Accordingly, the disk-shaped recording medium is fed by the feeder mechanism in a state where the disk holder is moved to the set predetermined movement position.

Fifth, in the disk conveyor apparatus according to the present technology, it is desirable for the type of the disk cartridge to be identified on a basis of a difference in a shape of the case body.

Accordingly, the movement position of the disk holder is set on the basis of the difference in the shape of the case body.

Sixth, in the disk conveyor apparatus according to the present technology, it is desirable for the type of the disk cartridge to be differentiated by a number of disk-shaped recording media to be accommodated.

Accordingly, the movement position of the disk holder is set by the operation of the movement mechanism in accordance with the disk cartridge whose type differs depending on the difference in the number of disk-shaped recording media to be accommodated.

Seventh, in the disk conveyor apparatus according to the present technology, it is desirable for the type of the disk cartridge to be differentiated by a difference in a thickness of the disk-shaped recording media.

Accordingly, the movement position of the disk holder is set by the operation of the movement mechanism in accordance with the disk cartridge whose type differs depending on the difference in the thickness of the disk-shaped recording media.

Eighth, in the disk conveyor apparatus according to the present technology, it is desirable for the disk cartridge to include an information storage unit that stores type information, the disk conveyor apparatus to further include a reading unit that reads out the type information stored in the information storage unit, and the movement mechanism to be operated on a basis of the type information read out by the reading unit.

Accordingly, the movement position of the disk holder is set on the basis of the read type information.

Ninth, it is desirable for the disk conveyor apparatus according to the present technology to further include a bias spring that presses a part of the disk holder against the movement mechanism in one direction.

Accordingly, the disk holder is moved while being pressed against the movement mechanism by the bias spring in one direction.

Tenth, in the disk conveyor apparatus according to the present technology, it is desirable for the one direction to be an upward direction, and the disk holder to be moved downwardly toward the movement position in the state where the disk cartridge is held.

Accordingly, the disk holder is moved toward the movement position while being biased in a direction opposite to a movement direction toward the movement position.

Eleventh, in the disk conveyor apparatus according to the present technology, it is desirable for the one direction to be a downward direction, and the disk holder to be moved upwardly toward the movement position in the state where the disk cartridge is held.

Accordingly, the disk holder is moved toward the movement position while being biased in a direction opposite to the movement direction toward the movement position.

Twelfth, in the disk conveyor apparatus according to the present technology, it is desirable for a torsion coil spring to be used as the bias spring.

Accordingly, a difference in a bias force of the bias spring due to the movement position of the disk holder becomes small.

Thirteenth, it is desirable for the disk conveyor apparatus according to the present technology to further include: a driving member that is moved linearly; and a linear sensor that detects a movement position of the driving member, the disk holder to be moved along with the movement of the driving member, and the movement position of the disk holder to be set on a basis of a detection result of the linear sensor.

Accordingly, the movement position of the driving member is detected by the linear sensor during the movement of the disk holder accompanying the driving member.

Fourteenth, in the disk conveyor apparatus according to the present technology, it is desirable for a rack gear to be used as the driving member, and the linear sensor to include a coupling unit that is coupled with the rack gear and is moved along with a movement of the rack gear.

Accordingly, the coupling unit of the linear sensor is moved along with the rack gear.

Fifteenth, it is desirable for the disk conveyor apparatus according to the present technology to further include a cam slider that slidably supports the disk holder, and the disk holder to be moved by a movement of the cam slider, in a direction orthogonal to a movement direction of the cam slider.

Accordingly, the disk holder and the cam slider are moved in mutually-orthogonal directions, so a movement space of the disk holder in the movement direction becomes small.

Sixteenth, in the disk conveyor apparatus according to the present technology, it is desirable for a pair of cam sliders to be respectively arranged on both sides of the disk holder, and the disk conveyor apparatus to further include a coupling frame that couples the pair of cam sliders.

Accordingly, the disk holder is moved by a synchronous movement of the pair of cam sliders that are respectively arranged on both sides of the disk holder and coupled by the coupling frame.

Advantageous Effects of Invention

According to the present technology, the movement position of the disk holder is set by the operation of the movement mechanism corresponding to the type of the disk cartridge held by the disk holder. Therefore, it becomes possible to handle different types of disk cartridges and improve general versatility regarding the disk cartridge.

It should be noted that the effects described herein are not necessarily limited, and any effect described in the present disclosure may be obtained.

BRIEF DESCRIPTION OF DRAWINGS

FIG. 13 A bottom view showing a movement mechanism and the like.

FIG. 17 A schematic enlarged side view showing an initial state of respective arms and the like.

MODES FOR CARRYING OUT THE INVENTION

Figure 1:
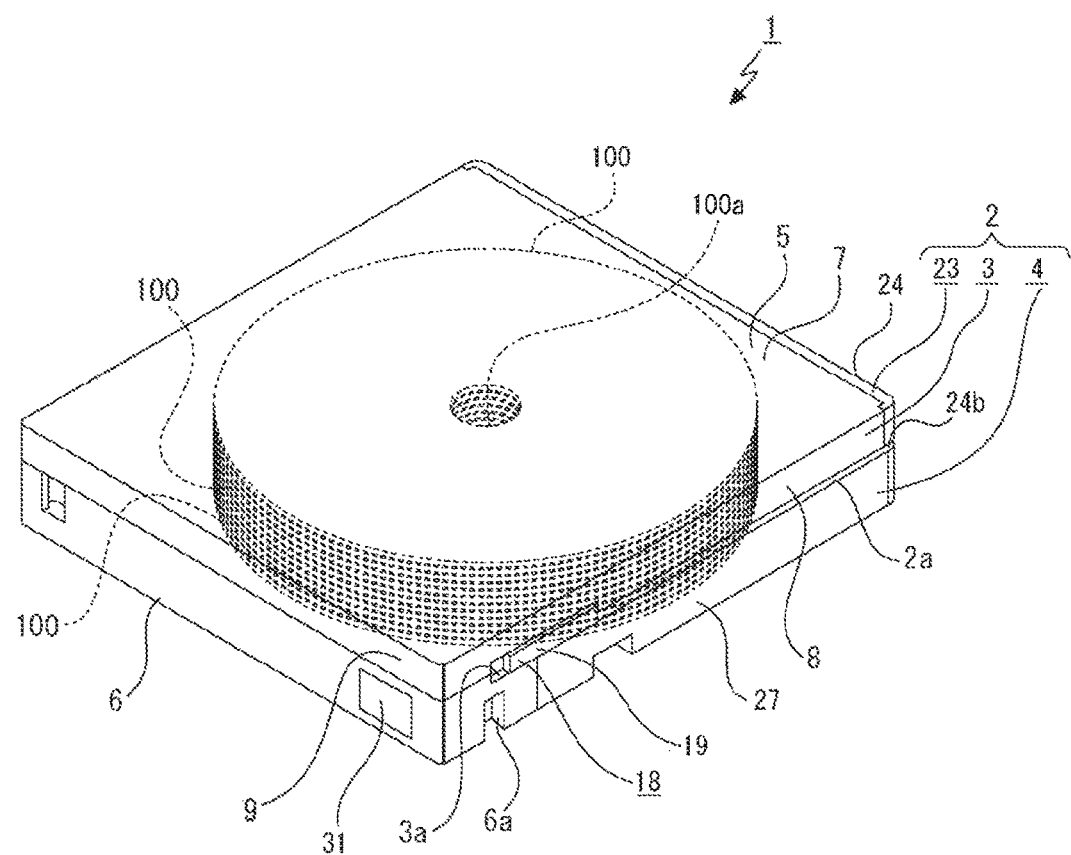
FIG. 1 A perspective view showing an embodiment of a disk conveyor apparatus according to the present technology together with FIGS. 2 to 27, the view showing a disk cartridge used in the disk conveyor apparatus.
Figure 2:
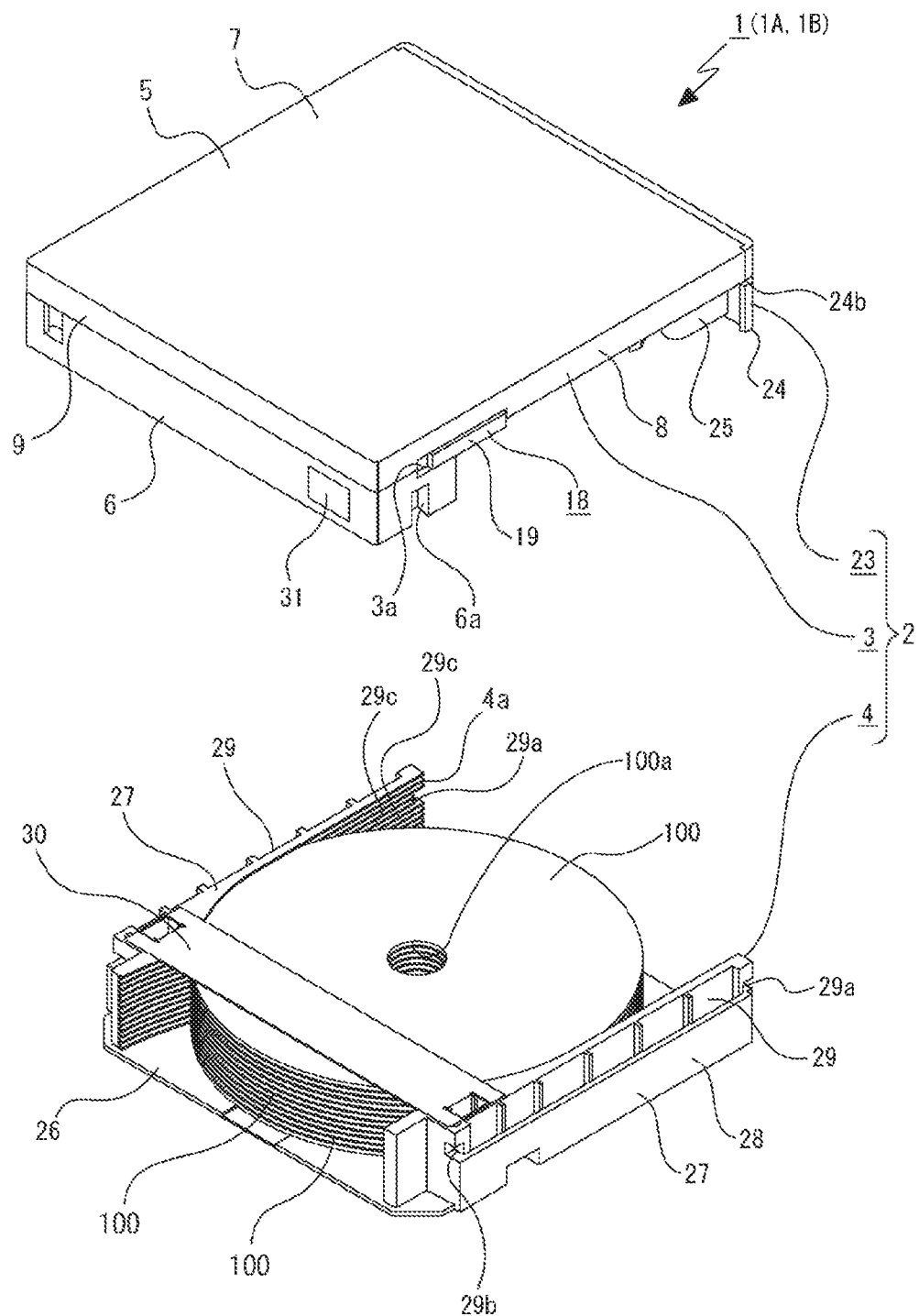
FIG. 2 A perspective view of the disk cartridge that shows a state where a first shell and a second shell are separated.
Figure 3:
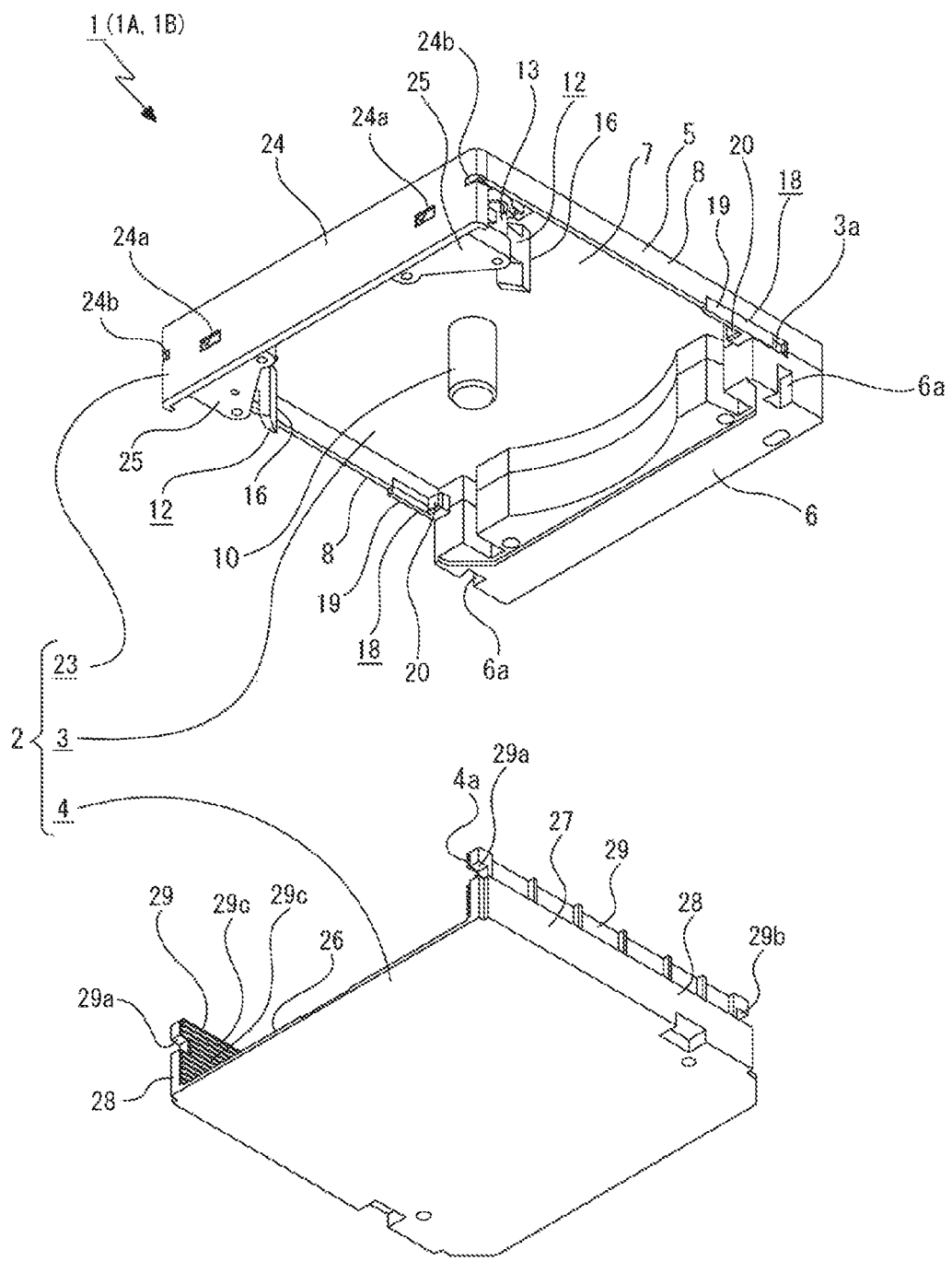
FIG. 3 A perspective view of the disk cartridge when viewed from a direction different from that of FIG. 2, the view showing the state where the first shell and the second shell are separated.
Figure 4:
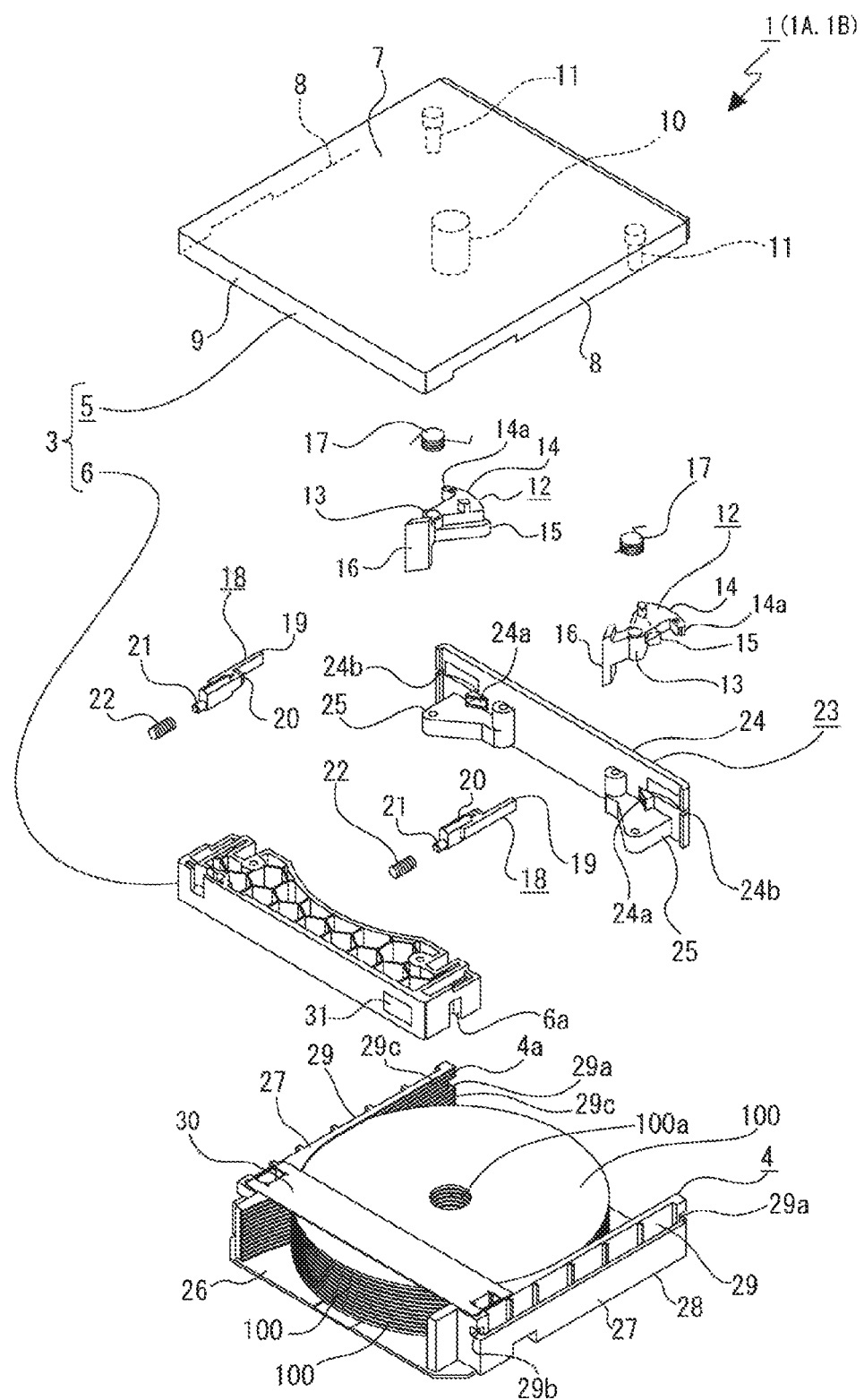
FIG. 4 An exploded perspective view of the disk cartridge.

Hereinafter, embodiments of a disk conveyor apparatus according to the present technology will be described with reference to the attached drawings.

In descriptions below, front, rear, upper, lower, right-, and left-hand directions are indicated while assuming that a direction in which a disk cartridge is inserted into a cartridge insertion/ejection port of the disk conveyor apparatus is the rearward direction.

It should be noted that the front, rear, upper, lower, right-, and left-hand directions described below are used for convenience of explanation, and the directions are not limited to these directions regarding the embodiments of the present technology.

<Overall Configuration of Disk Cartridge>

First, a configuration of the disk cartridge used in the disk conveyor apparatus will be described (see FIGS. 1 to 4).

In a disk cartridge 1, necessary portions are arranged inside a case body 2, and the case body 2 includes a first shell 3 and a second shell 4. Inside the case body 2, a plurality of disk-shaped recording media 100, 100, . . . can be accommodated at equal intervals in a vertical direction. Therefore, the disk-shaped recording media 100, 100, . . . are accommodated in the case body 2 while center axes thereof extend in the vertical direction, and a direction of the center axes is assumed to be the vertical direction.

As the disk cartridge 1, for example, different types of disk cartridges in which the number of disk-shaped recording media 100 to be accommodated differs are used. As the different types of disk cartridges 1, there are a disk cartridge 1A in which the number of disk-shaped recording media 100 to be accommodated is, for example, 11, and a disk cartridge 1B in which the number of disk-shaped recording media 100 to be accommodated is, for example, 12. An outer shape and a size of the outer shape of the disk cartridge 1A and the disk cartridge 1B are the same except for presence/absence of an identification hole to be described later. In the disk cartridge 1A and the disk cartridge 1B, structures of the case bodies 2 are the same except that the number of holding grooves (to be described later) that hold the disk-shaped recording media 100, 100, . . . and intervals (pitches) differ.

The first shell 3 and the second shell 4 can be coupled or separated in the vertical direction.

The first shell 3 is formed by coupling a base body 5 and an auxiliary base 6 attached to a front end portion of the base body 5 in the vertical direction.

The base body 5 includes a base surface portion 7 facing the vertical direction, side surface portions 8, 8 that respectively protrude downwardly from left- and right-hand both end portions of the base surface portion 7, and a front surface portion 9 that protrudes downwardly from a front end portion of the base surface portion 7.

At a center portion of the base surface portion 7, a round-shaft-shaped center pin 10 protruding downwardly is provided. Support shafts 11, 11 that protrude downwardly are provided at positions near a rear end of the base surface portion 7 while being spaced apart from each other on left- and right-hand sides.

At a lower end portion of left- and right-hand both end portions of the auxiliary base 6, groove-like gripping portions 6a, 6a that are respectively opened sidewardly and downwardly are formed.

At positions near the front end at left- and right-hand both surface portions of the first shell 3, slider support portions 3a, 3a are formed respectively.

Lock levers 12, 12 are rotatably supported by the support shafts 11, 11 of the first shell 3, respectively. The lock lever 12 includes a cylindrical supported portion 13 into which the support shaft 11 is inserted for support, a lock portion 14 that protrudes substantially rearwardly from substantially an upper half portion of the supported portion 13, a lock release portion 15 that protrudes from substantially a lower half portion of the supported portion 13 in an oblique rearward direction, and a pressing protrusion portion 16 that protrudes from the supported portion 13 in substantially the forward direction.

The lock portion 14 includes a lock protrusion portion 14a that protrudes sideways at a tip end portion thereof.

The lock levers 12, 12 are rotatable using the support shafts 11, 11 as fulcrums. The lock levers 12, 12 are biased by bias springs 17, 17 in a direction in which the lock protrusion portions 14a, 14a of the lock portions 14, 14 respectively approach the side surface portions 8, 8. The bias spring 17 is, for example, a torsion coil spring, and both end portions thereof respectively engage with the base surface portion 7 and the lock portion 14 while being supported by the support shaft 11.

Lock sliders 18, 18 are respectively supported by the slider support portions 3a, 3a of the first shell 3 while being slidable in a front-back direction.

The lock slider 18 is constituted of a supported portion 19 that extends in the front-back direction, a lock portion 20 that protrudes inwardly from a portion of the supported portion 19 excluding the rear end portion, and a spring support shaft portion 21 that protrudes forwardly from a front surface of the lock portion 20.

In the lock sliders 18, 18, the supported portions 19, 19 are slidably supported by the slider support portions 3a, 3a, respectively, and coil springs 22, 22 are supported by the spring support shaft portions 21, 21, respectively. Both ends of the coil spring 22 in the front-back direction are in contact with a part of a front surface of the lock portion 20 and the side surface portion 8, and the coil spring 22 biases the lock slider 18 rearwardly.

An opening/closing panel 23 is attached to the rear end portion of the first shell 3. The opening/closing panel 23 includes a laterally-long rectangular plate-like panel portion 24 facing the front-back direction and to-be-attached protrusion portions 25, 25 that protrude forwardly from a lower end portion of a front surface of the panel portion 24 while being spaced apart from each other in the left- and right-hand directions.

In the panel portion 24, insertion holes 24a, 24a are formed while being spaced apart from each other in the left- and right-hand directions. Insertion notches 24b, 24b that are respectively opened outwardly are formed at left- and right-hand both end portions of the panel portion 24.

The opening/closing panel 23 is attached to the first shell 3 with the to-be-attached protrusion portions 25, 25 being respectively coupled to the support shafts 11, 11 of the base surface portion 7.

In a state where the opening/closing panel 23 is attached to the first shell 3, the lock release portions 15, 15 of the lock levers 12, 12 are respectively positioned in front of the insertion holes 24a, 24a.

The second shell 4 is formed by integrally forming a base surface portion 26 that faces the vertical direction and side surface portions 27, 27 that respectively protrude upwardly from left- and right-hand both end portions of the base surface portion 26. An opening located at a rear end of the second shell 4 is formed as a disk insertion/ejection port 4a into/from which the disk-shaped recording media 100, 100, . . . are inserted/ejected in the second shell 4.

The side surface portion 27 is constituted of an outer wall portion 28 and an inner wall portion 29 positioned on an inner side of the outer wall portion 28. A height of the outer wall portion 28 is substantially half the height of the inner wall portion 29, and an upper surface thereof is set to be lower than an upper surface of the inner wall portion 29.

At a rear end portion of the inner wall portion 29, a first lock concave portion 29a that is opened rearwardly while penetrating in the left- and right-hand directions is formed. At a position near a front end of the inner wall portion 29, a second lock concave portion 29b that is opened forwardly and outwardly is formed.

Holding grooves 29c, 29c, . . . are formed on an inner surface of the inner wall portion 29, and the holding grooves 29c, 29c, . . . are positioned at equal intervals in the vertical direction. 11 holding grooves 29c, 29c, . . . are formed at equal-interval pitches in an inner surface wall portion 29 of the disk cartridge 1A, and 12 holding grooves 29c, 29c, . . . are formed at equal-interval pitches in the inner surface wall portion 29 of the disk cartridge 1B. The pitches of the holding grooves 29c, 29c, . . . formed in the disk cartridge 1A are slightly larger than the pitches of the holding grooves 29c, 29c, . . . formed in the disk cartridge 1B.

A bridge member 30 is attached at a position near the front end between the side surface portions 27, 27 of the second shell 4. The bridge member 30 is formed by bending a plate-like metal material into a predetermined shape.

For example, an information input sheet 31 is attached, as an information storage unit, to the disk cartridge 1 at one end of the front surface of the case body 2 in the lateral direction. For example, input to the information input sheet 31 is predetermined information such as information on whether the disk cartridge is the disk cartridge 1A or the disk cartridge 1B, information related to the type of the disk-shaped recording media 100, 100, . . . , and information related to a total recordable capacity of the disk-shaped recording media 100, 100, . . . , a remaining recordable capacity of each of the disk-shaped recording media 100, 100, . . . , and the like.

It should be noted that the information storage unit is not limited to the information input sheet 31, and appropriate means such as print information including a barcode printed on the case body 2 and the like and a recording chip embedded into the case body 2 can be used as the information storage unit, for example.

In the disk cartridge 1 configured as described above, the disk-shaped recording media 100, 100, . . . are held inside the case body 2 in a state where both end portions thereof are respectively inserted into the holding grooves 29c, 29c, . . . .

In a state where the first shell 3 and the second shell 4 are coupled and the opening/closing panel 23 is attached to the first shell 3 to configure the case body 2, insertion grooves 2a, 2a that extend in the front-back direction are respectively formed between lower surfaces of the side surface portions 8, 8 of the first shell 3 and upper surfaces of the outer wall portions 28, 28 of the second shell 4. Front ends of the insertion grooves 2a, 2a are continuous with the slider support portions 3a, 3a of the first shell 3, respectively, and rear ends thereof are continuous with the insertion notches 24b, 24b formed in the panel portion 24 of the opening/closing panel 23, respectively.

It should be noted that an identification hole (not shown) that is opened rearwardly is formed in the opening/closing panel 23 of one of the disk cartridge 1A and the disk cartridge 1B. An identification pin of the disk conveyor apparatus to be described later is inserted into the identification hole, and which of the disk cartridge 1A or disk cartridge 1B the disk cartridge is, is identified in accordance with presence/absence of the identification hole.

<Coupling State of Disk Cartridge>

Figure 5:
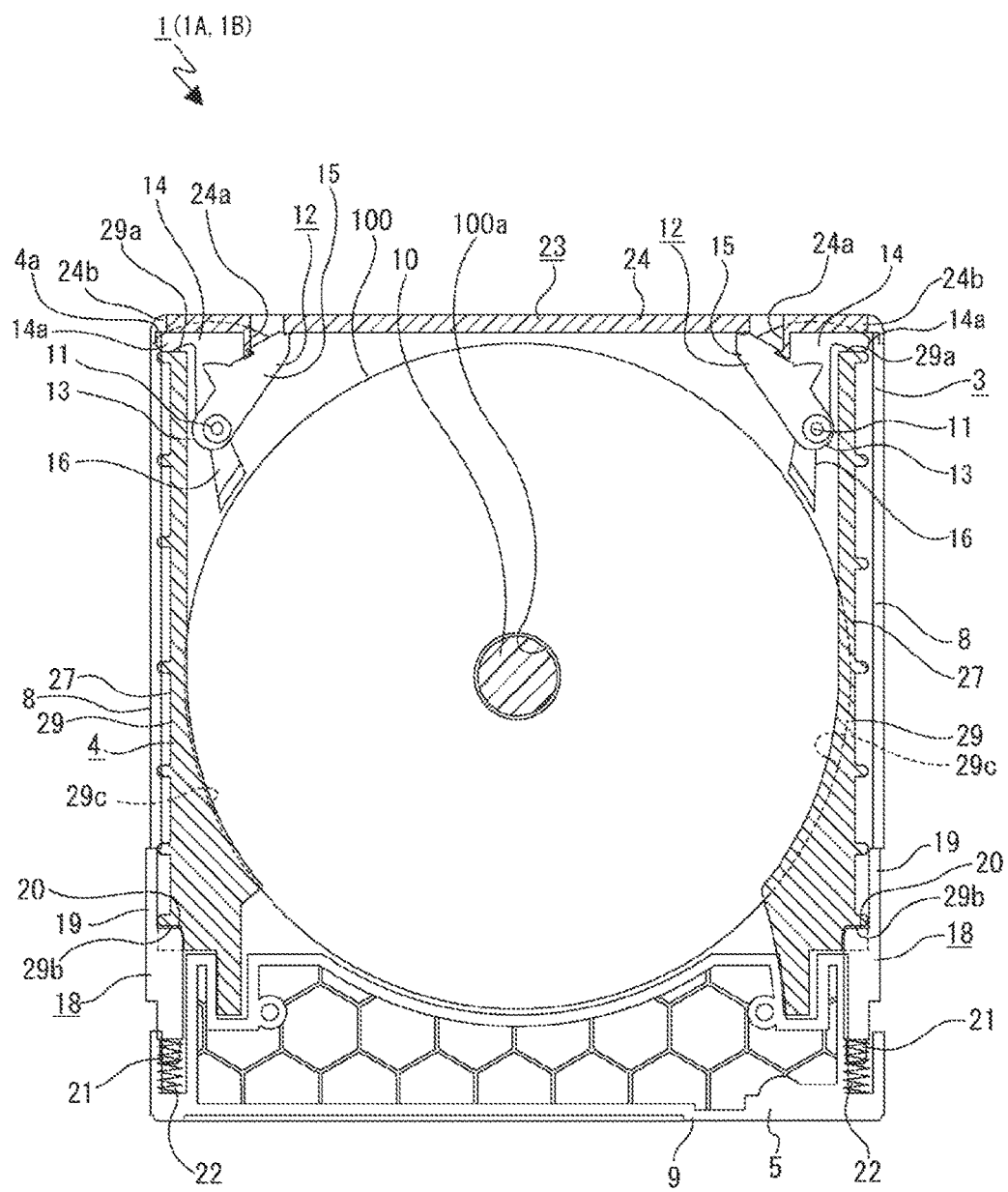
FIG. 5 A cross-sectional diagram showing a state where the first shell and the second shell are locked.

The coupling state of the disk cartridge 1 will be described below (see FIG. 5).

The first shell 3 and the second shell 4 are coupled in a state where the base surface portion 7 of the base body 5 and the base surface portion 26 face each other in the vertical direction.

In a state where the first shell 3 and the second shell 4 are coupled, the first shell 3 and the second shell 4 are locked by the lock levers 12, 12 and the lock sliders 18, 18.

The lock levers 12, 12 are positioned at rotational ends in directions (outer side) in which tip end portions of the lock portions 14, 14 are set apart from each other by a bias force of the bias springs 17, 17, and the lock protrusion portions 14a, 14a of the lock portions 14, 14 are respectively inserted into and engage with the first lock concave portions 29a, 29a formed in the side surface portions 27, 27 of the second shell 4.

The lock levers 12, 12 are positioned such that the pressing protrusion portions 16, 16 come into contact with or come close to outer circumferential surfaces of the disk-shaped recording media 100, 100, . . . . By bringing the pressing protrusion portions 16, 16 into contact with or close to the outer circumferential surfaces of the disk-shaped recording media 100, 100, . . . , the disk-shaped recording media 100, 100, . . . are prevented from coming out in the rearward direction.

The lock sliders 18, 18 are positioned at a rear movement end by the bias force of the coil springs 22, 22, and the lock portions 20, 20 are respectively inserted into and engage with the second lock concave portions 29b, 29b formed in the side surface portions 27, 27 of the second shell 4.

In the state where the first shell 3 and the second shell 4 are coupled to each other, a center pin 10 is inserted into center holes 100a, 100a, . . . of the disk-shaped recording media 100, 100, . . . .

<Overall Configuration of Disk Conveyor Apparatus>

Next, a configuration of a disk conveyor apparatus 40 will be described (see FIGS. 6 to 15).

Figure 6:
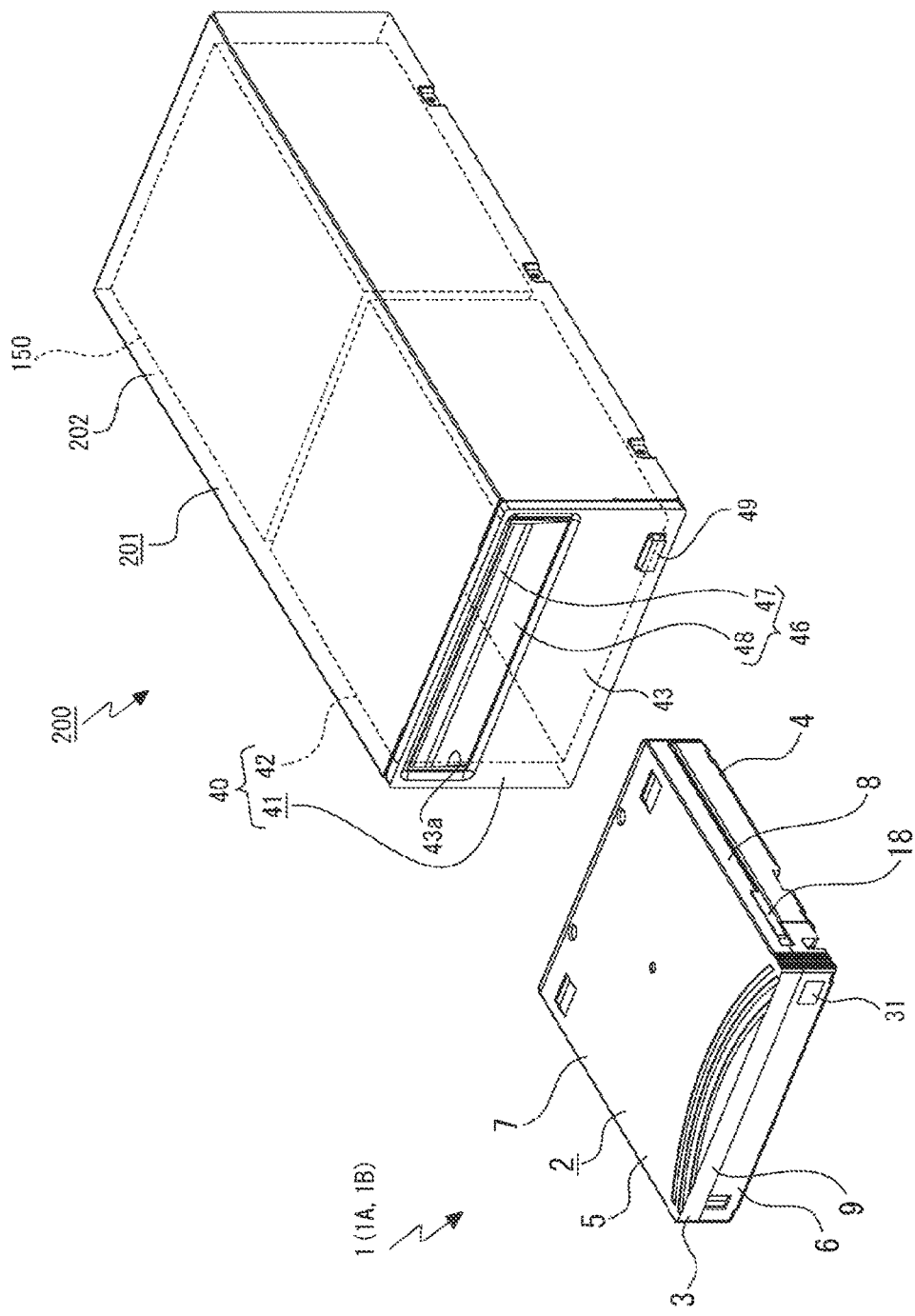
FIG. 6 A schematic perspective view showing an apparatus unit including the disk conveyor apparatus together with the disk cartridge.
Figure 7:
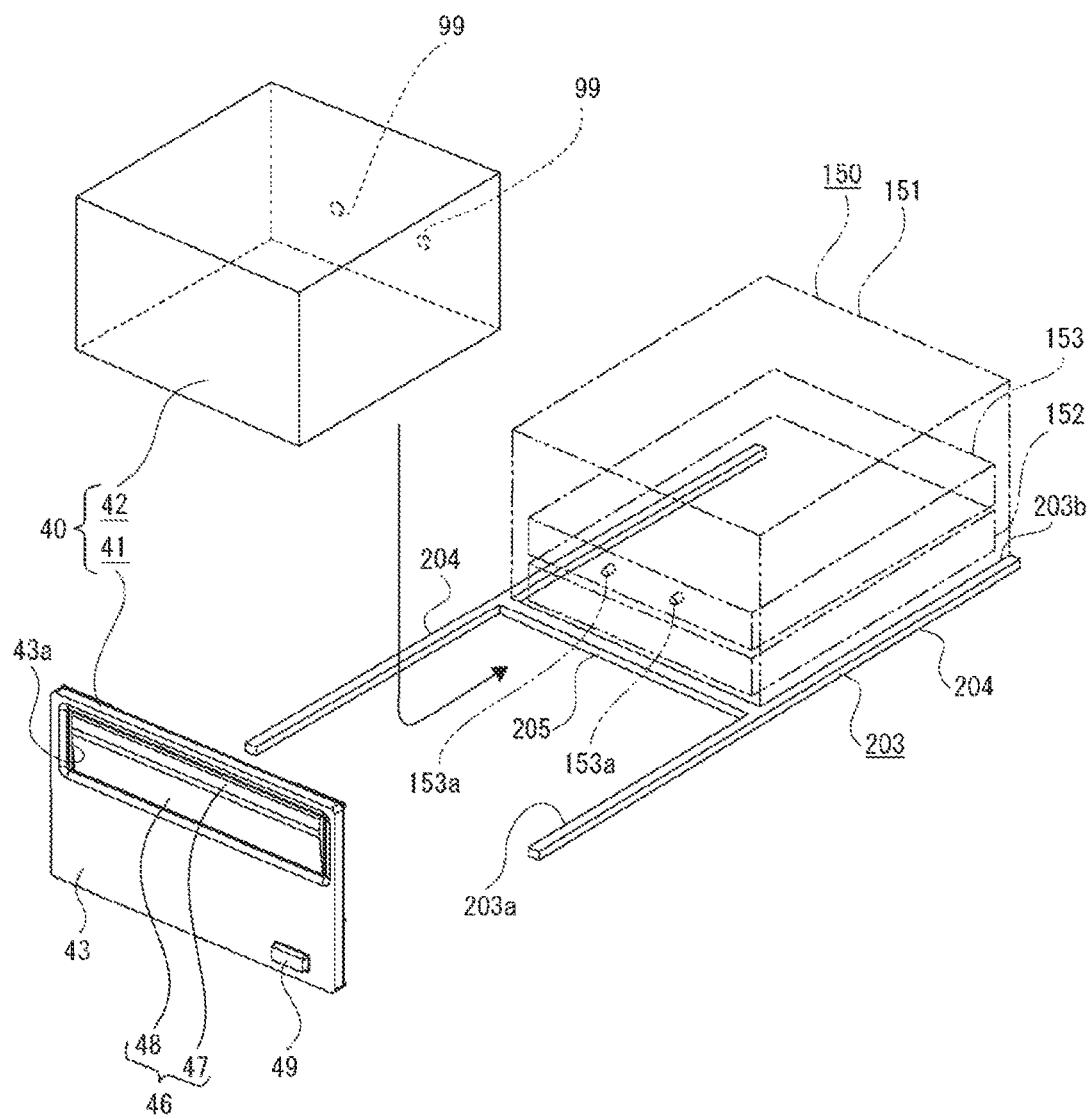
FIG. 7 A schematic perspective view of the apparatus unit that shows a relationship between the disk conveyor apparatus and a disk drive apparatus.

The disk conveyor apparatus 40 is configured as a part of an apparatus unit 200, for example (see FIGS. 6 and 7).

The apparatus unit 200 includes the disk conveyor apparatus 40 and a disk drive apparatus 150, and also includes an outer casing 201. The outer casing 201 includes a box-shaped outer frame 202 that is opened forwardly and downwardly and a base frame 203 attached to a lower end portion of the outer frame 202. The base frame 203 includes parallel side portions 204, 204 that are positioned on the left and right-hand sides and a coupling portion 205 that couples the side portions 204, 204. In the base frame 203, the coupling portion 205 couples center portions of the side portions 204, 204 in the front-back direction, a front-side portion is provided as a conveyor arrangement portion 203a with the coupling portion 205 being a reference, and a rear-side portion thereof is provided as a drive arrangement portion 203b.

The disk conveyor apparatus 40 is arranged substantially at a front half portion of the outer casing 201, and the disk drive apparatus 150 is arranged on the rear side of the disk conveyor apparatus 40 in the outer casing 201.

The disk conveyor apparatus 40 includes a panel 41 that faces the front-back direction and is attached to a front end portion of the outer casing 201, and an apparatus body 42 that is arranged inside the outer casing 201 on the rear side of the panel 41. In the base frame 203, the apparatus body 42 of the disk conveyor apparatus 40 is arranged in the conveyor arrangement portion 203a, and the disk drive apparatus 150 is arranged in the drive arrangement portion 203b.

Figure 8:
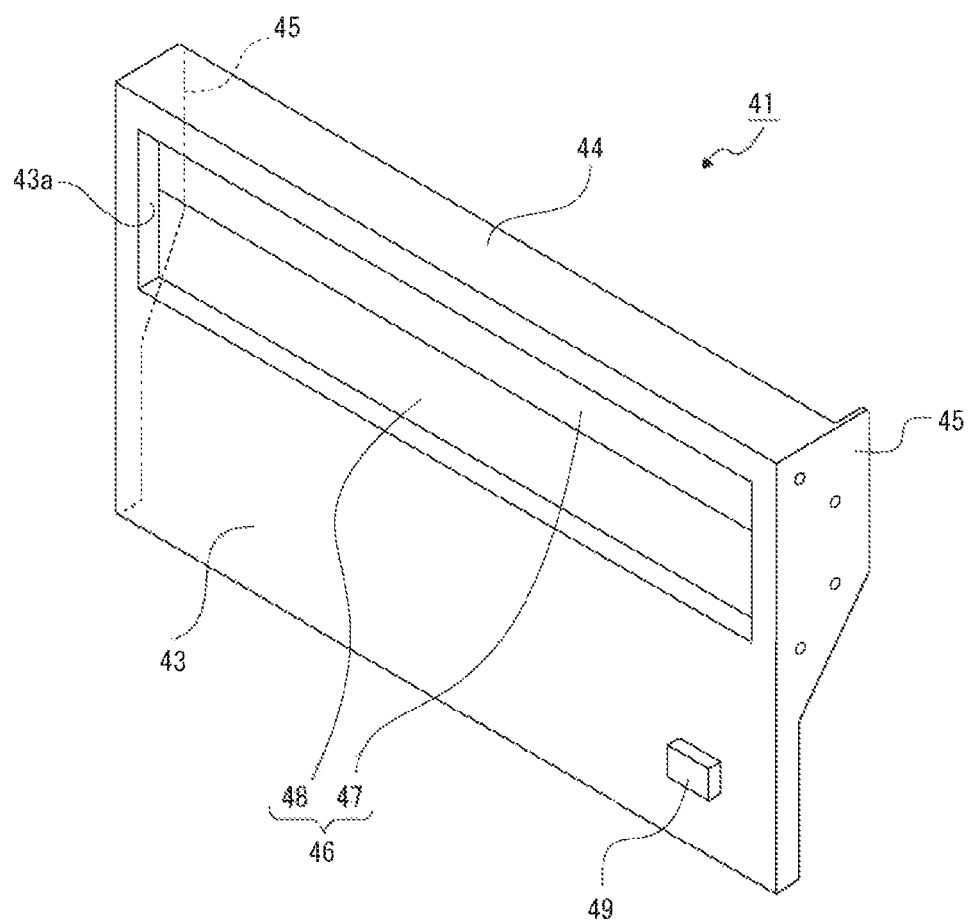
FIG. 8 A perspective view of a panel.

The panel 41 includes a rectangular panel surface portion 43 that faces the front-back direction, an upper surface portion 44 that protrudes rearwardly from an upper edge of the panel surface portion 43, and side surface portions 45, 45 that respectively protrude rearwardly from left- and right-hand both side edges of the panel surface portion 43 (see FIG. 8).

A laterally-long cartridge insertion/ejection port 43a penetrating in the front-back direction is formed at an upper end portion of the panel surface portion 43, and the cartridge insertion/ejection port 43a can be opened and closed by a shutter 46. The shutter 46 includes an upper-side opening/closing plate 47 and a lower-side opening/closing plate 48. An ejection button 49 is arranged at a lower end portion of the panel surface portion 43.

Figure 9:
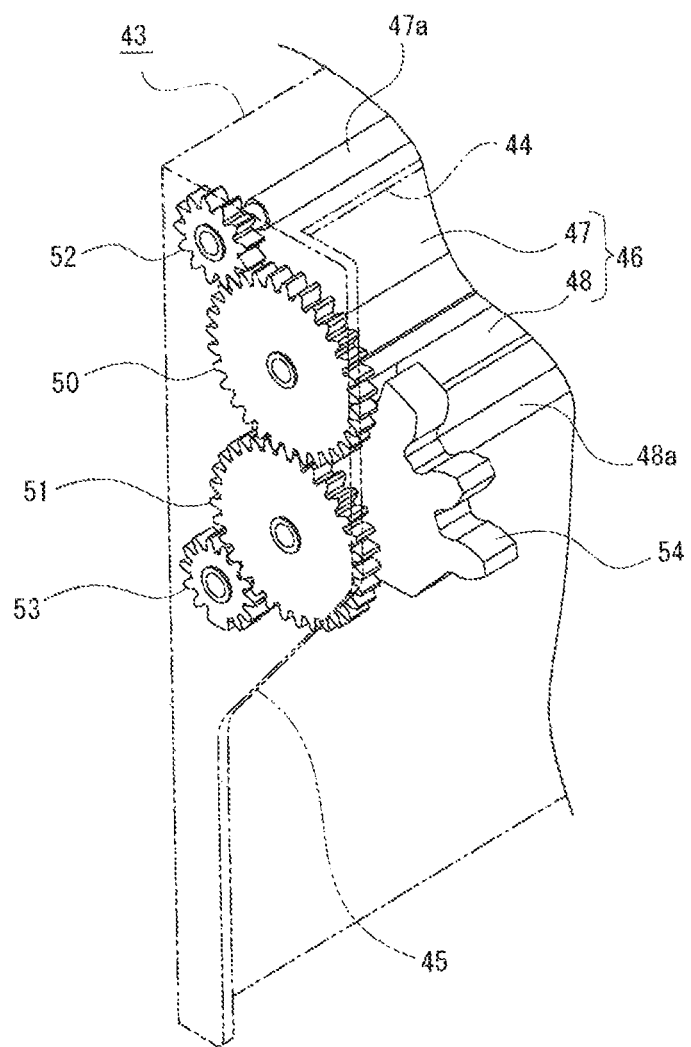
FIG. 9 A perspective view showing a mechanism supported by the panel.

On an inner surface side of one of the side surface portions 45, 45, a first interlocking gear 50 and a second interlocking gear 51 are supported while intermeshing with each other (see FIG. 9).

A rotational shaft 47a is attached to an upper end portion of the upper-side opening/closing plate 47, and an upper-side opening/closing gear 52 is coupled to one end portion of the rotational shaft 47a. A rotational shaft 48a is attached to a lower end portion of the lower-side opening/closing plate 48, and a lower-side opening/closing gear 53 is coupled to one end portion of the rotational shaft 48a. The upper-side opening/closing gear 52 intermeshes with the first interlocking gear 50, and the lower-side opening/closing gear 53 intermeshes with the second interlocking gear 51.

Since the upper-side opening/closing gear 52, the first interlocking gear 50, the second interlocking gear 51, and the lower-side opening/closing gear 53 sequentially intermesh in this way, the upper-side opening/closing plate 47 and the lower-side opening/closing plate 48 are rotated (opened and closed) synchronously with the rotational shafts 47a and 48a being fulcrums. At this time, the upper-side opening/closing plate 47 and the lower-side opening/closing plate 48 are rotated on the rear side of the panel surface portion 43.

An operation gear 54 including several gear teeth is attached to a lower end portion of an inner surface of the lower-side opening/closing plate 48. The operation gear 54 is positioned in the vicinity of the lower-side opening/closing gear 53 and is rotated along with a rotation operation of the lower-side opening/closing plate 48.

Figure 10:
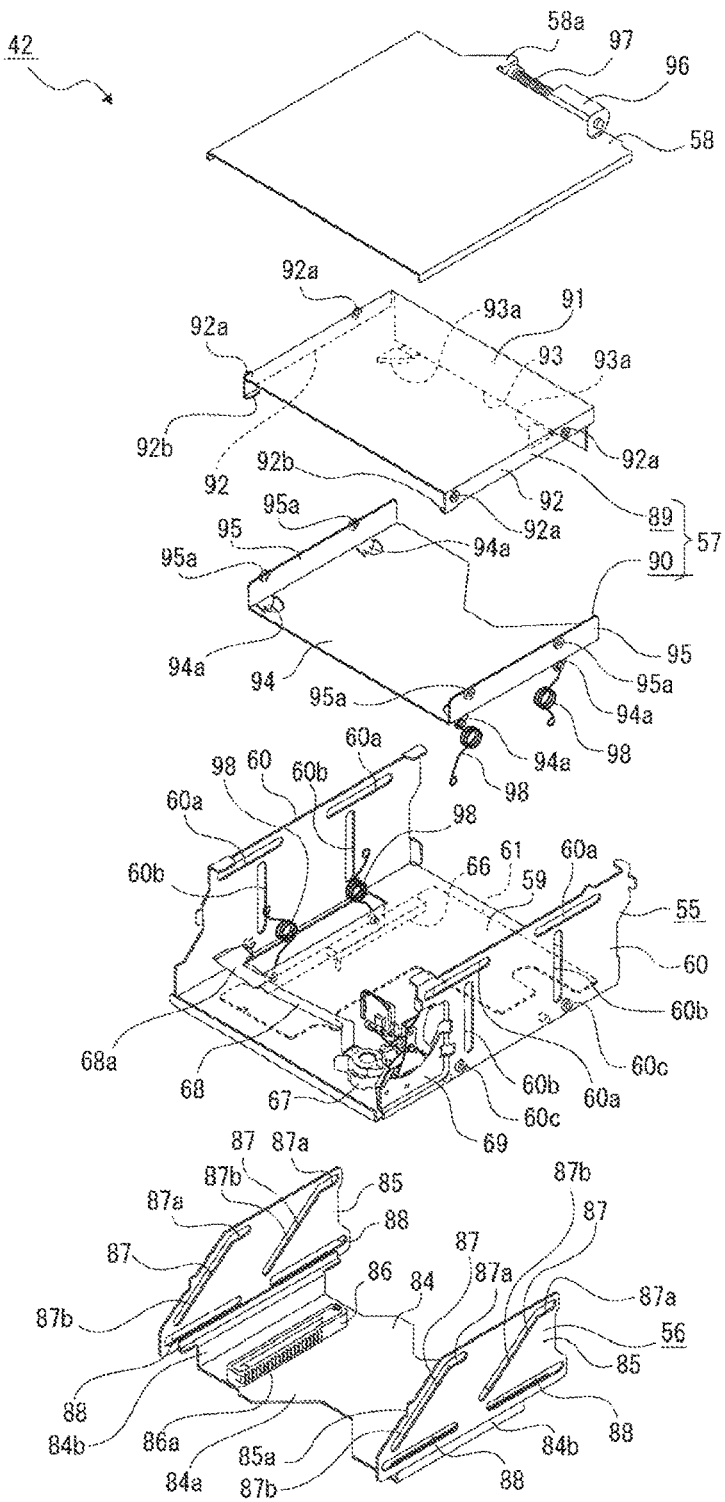
FIG. 10 An exploded perspective view showing an internal structure of the disk conveyor apparatus.
Figure 11:
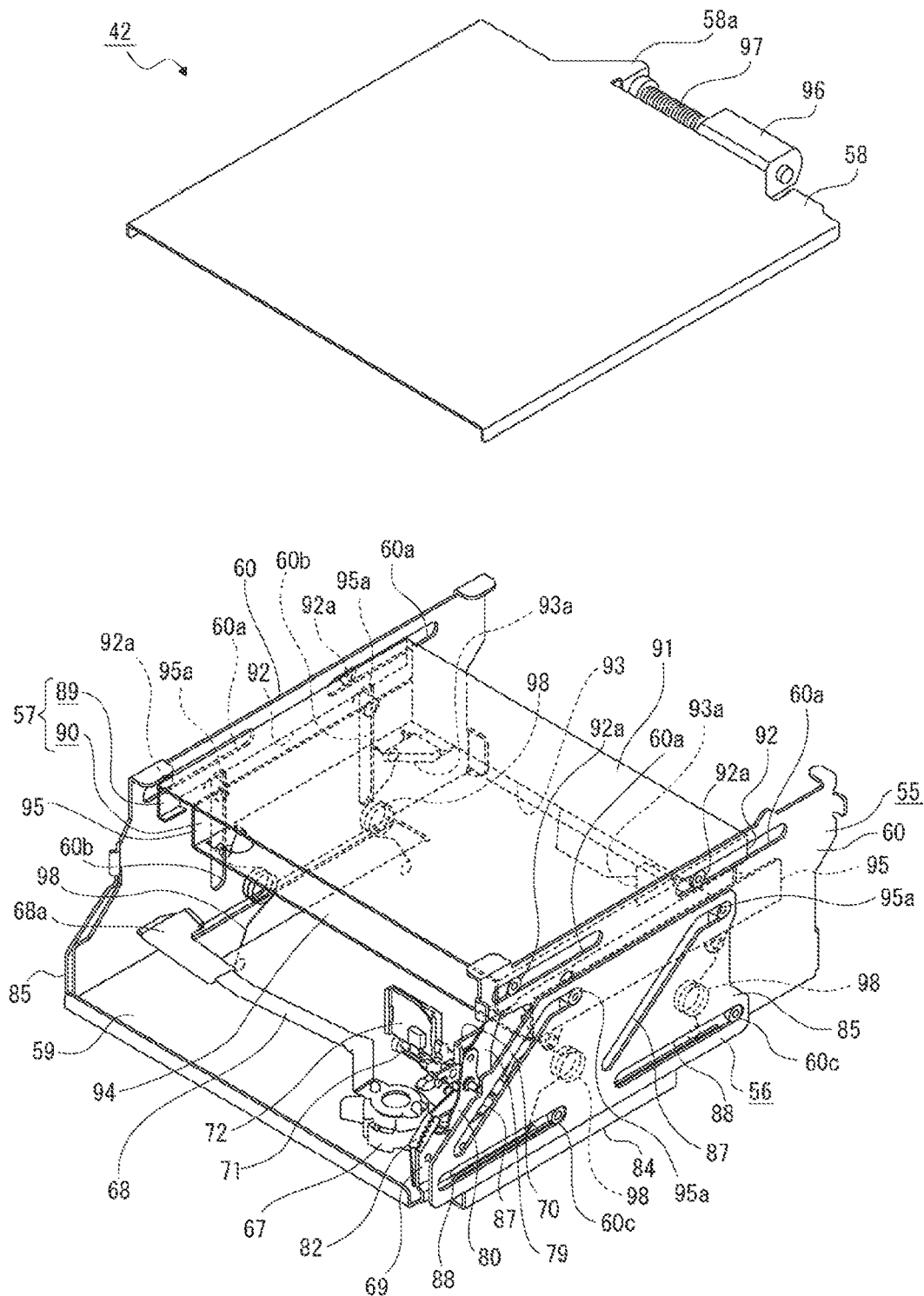
FIG. 11 A perspective view showing the internal structure of the disk conveyor apparatus.

The apparatus body 42 includes a support frame 55, a cam driving body 56, a disk holder 57, and a top plate 58 (see FIGS. 10 and 11).

Figure 12:
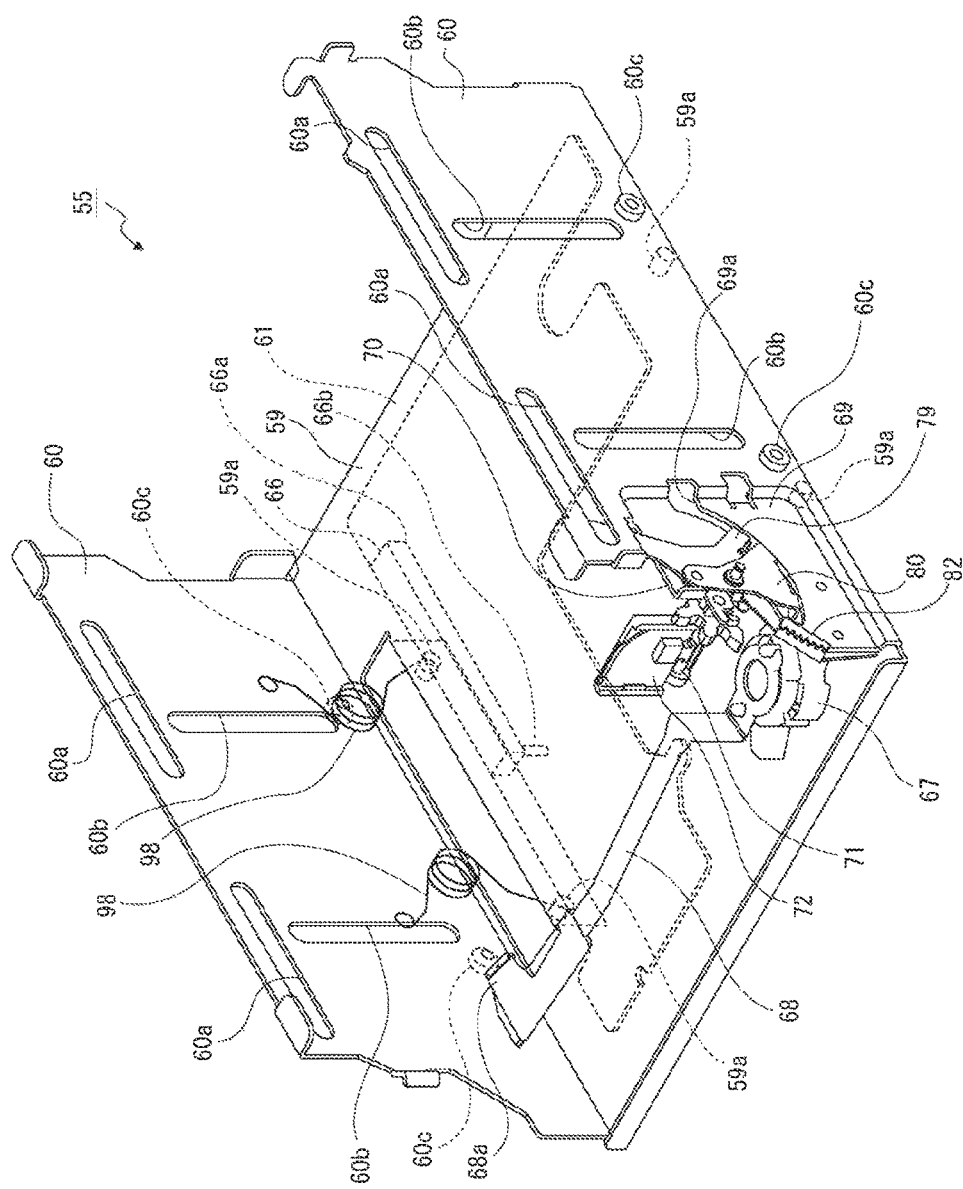
FIG. 12 A perspective view of a support frame.
Figure 13:
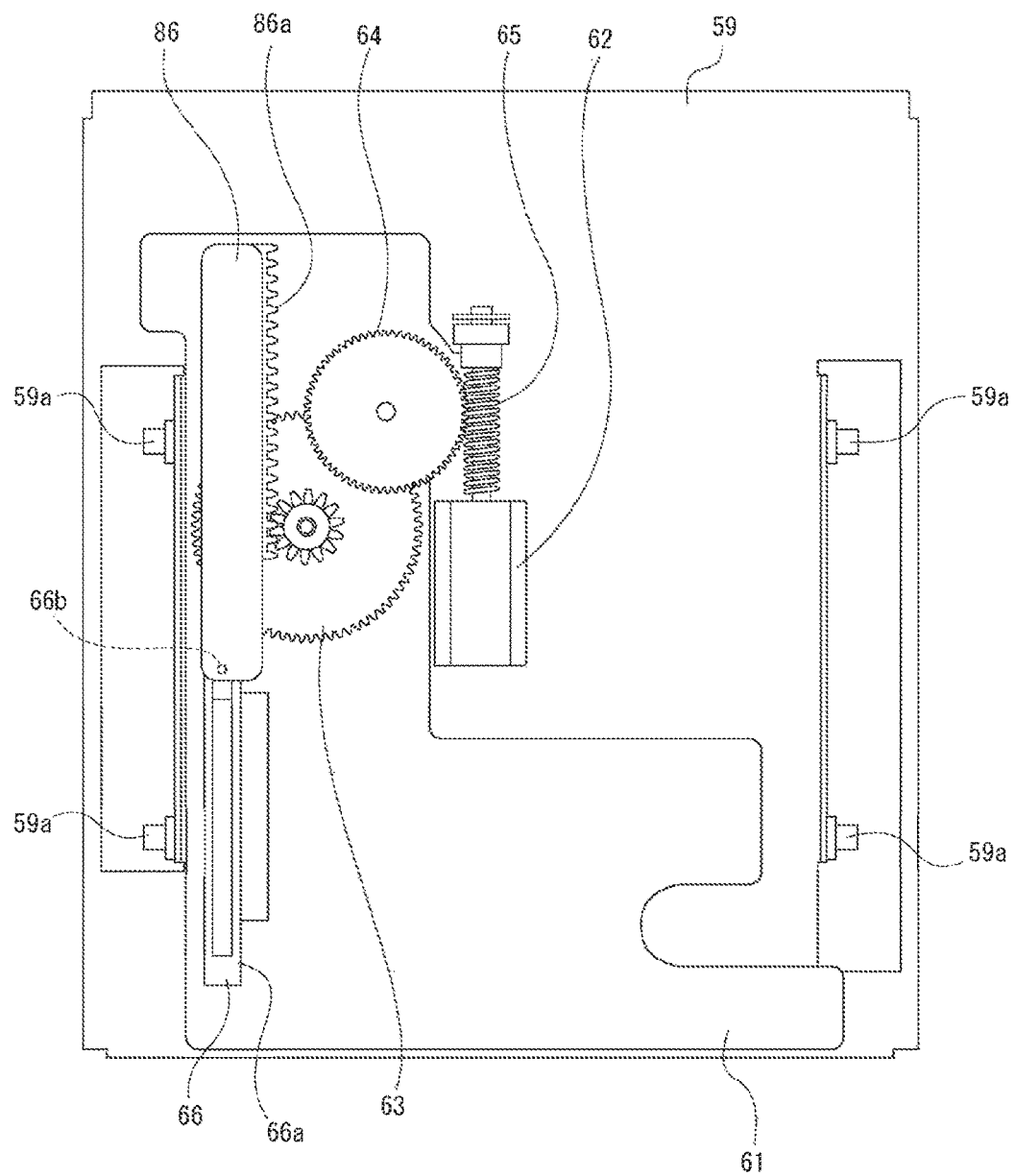
Figure 14:
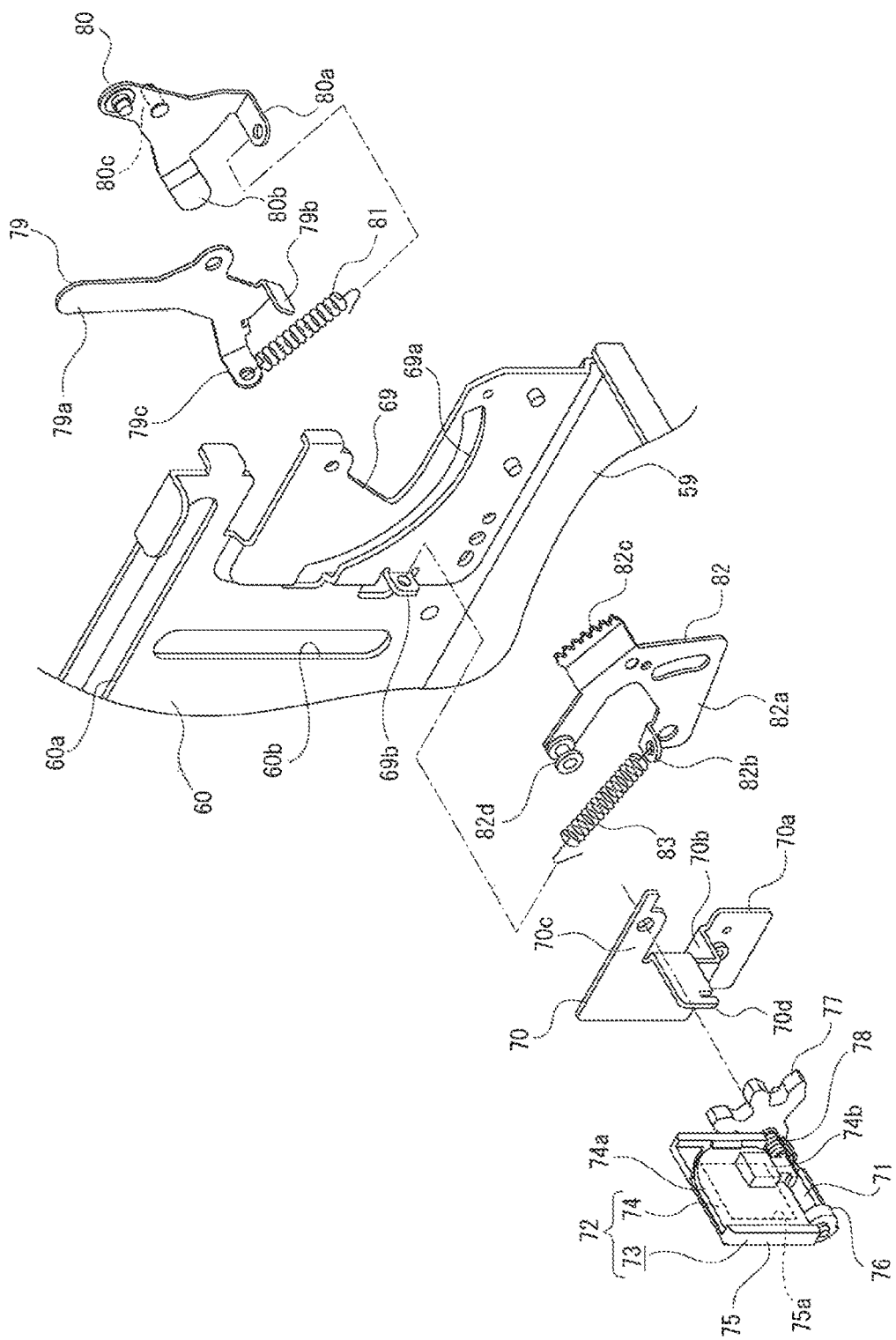
FIG. 14 An exploded perspective view showing the support frame and respective portions supported by a mechanism support portion of the support frame.
Figure 15:
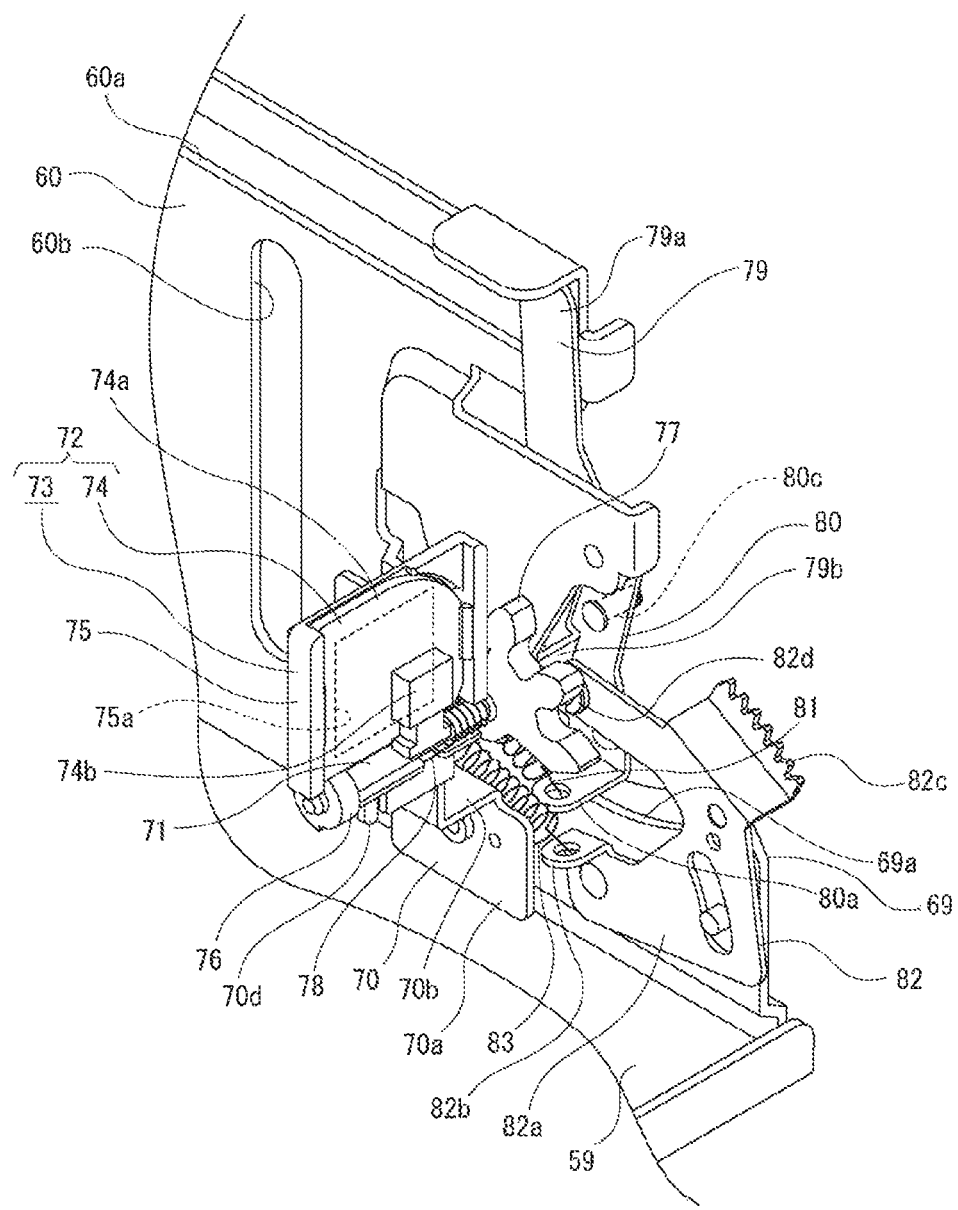
FIG. 15 A perspective view showing the support frame and the respective portions supported by the mechanism support portion of the support frame.

The support frame 55 includes a bottom surface plate portion 59 facing the vertical direction and side surface plate portions 60, 60 facing the lateral direction, and left- and right-hand both side edges of the bottom surface plate portion 59 and lower edges of the side surface plate portions 60, 60 are continuous with each other (see FIGS. 12 and 13).

On a lower surface of the bottom surface plate portion 59, a substrate 61 and an elevating motor 62 are attached, and intermediate gears 63, 64 are supported (see FIG. 13). The elevating motor 62 and the intermediate gears 63, 64 function as a movement mechanism for moving the disk holder 57 in the vertical direction which is a center axis direction of the disk-shaped recording medium 100. A worm 65 is coupled to a motor shaft of the elevating motor 62, and the worm 65 intermeshes with the intermediate gear 64. The intermediate gear 64 and the intermediate gear 63 intermesh with each other.

A linear sensor 66 is attached to a lower surface of the substrate 61. The linear sensor 66 includes a detection unit 66a extending in the front-back direction and a coupling pin 66b that is movable with respect to the detection unit 66a in the front-back direction.

Respective portions of the bottom surface plate portion 59 are bent downward, and spring-hooking protrusion portions 59a, 59a, . . . are provided on the portions that are bent downward. For example, 4 spring-hooking protrusion portions 59a, 59a, . . . are provided while being spaced apart from one another in the front-back direction and the lateral direction.

A feeder mechanism is arranged at a front end portion of the bottom surface plate portion 59 (see FIGS. 10 and 11). The feeder mechanism includes a coupling member 67 attached to the bottom surface plate portion 59, a feeding lever 68 coupled to the coupling member 67, and a rotational driving unit (not shown) such as a motor and gear for rotating the feeding lever 68. One end portion of the feeding lever 68 is coupled to the coupling member 67, and the other end portion is provided as a disk pressing portion 68a. The rotational driving unit is arranged on the lower surface side of the bottom surface plate portion 59.

The feeding lever 68 is rotatable in a horizontal direction, and a driving force of the rotational driving unit is transmitted to the coupling member 67. By a part of the coupling member 67 being rotated, the feeding lever 68 is rotated along with the rotation operation of the coupling member 67.

Guide holes 60a, 60a that extend in the front-back direction are formed at the upper end portion of the side surface plate portion 60 while being set apart from each other in the front-back direction, and guide holes 60b, 60b that extend vertically are formed on a lower side of the guide holes 60a, 60a while being set apart from each other in the front-back direction. Support pins 60c, 60c are provided on an outer surface of the lower end portion of the side surface plate portion 60 while being set apart from each other in the front-back direction.

The front end portion of one of the side surface plate portions 60 is provided as a mechanism support portion 69. An arc-shaped insertion arrangement hole 69a is formed in the mechanism support portion 69 (see FIGS. 14 and 15). In the mechanism support portion 69, a spring-hooking protrusion portion 69b formed by being bent inwardly is provided.

A bracket 70 is attached to the mechanism support portion 69. The bracket 70 includes a to-be-attached surface portion 70a that faces the lateral direction, a coupling surface portion 70b that protrudes sideways from an upper end portion of the to-be-attached surface portion 70a, a shaft attachment surface portion 70c that protrudes upwardly from the tip end portion of the coupling surface portion 70b while facing the lateral direction, and a spring support protrusion portion 70d that protrudes sideways from the shaft attachment surface portion 70c. The to-be-attached surface portion 70a of the bracket 70 is attached to an inner surface of the mechanism support portion 69.

A support shaft 71 is attached to an upper end portion of the shaft attachment surface portion 70c of the bracket 70. The support shaft 71 protrudes from the shaft attachment surface portion 70c to a side opposite to the mechanism support portion 69 side.

An antenna unit 72 is rotatably supported by the support shaft 71. The antenna unit 72 is formed by attaching an antenna 74 to an antenna holder 73.

The antenna holder 73 includes a frame-like portion 75 whose outer shape is a substantially rectangular shape, a support cylindrical portion 76 provided continuous with a lower end portion of the frame-like portion 75, and a gear portion 77 protruding from the frame-like portion 75. The gear portion 77 includes several gear teeth. An opening of the frame-like portion 75 is formed as a reading opening 75a.

The antenna 74 is attached to the frame-like portion 75. The antenna 74 includes an antenna substrate 74a and a connector 74b, and a connection line (not shown) is connected to the connector 74b. The antenna 74 functions as a reading unit that reads out type information of the disk cartridge 1, that is stored in the information input sheet 31 of the disk cartridge 1 provided as the information storage unit.

In the antenna unit 72, the support cylindrical portion 76 of the antenna holder 73 is supported by the support shaft 71. A torsion spring 78 is supported by the support shaft 71, and the antenna unit 72 is biased in one direction in a rotation direction by the torsion spring 78.

The antenna unit 72 is rotated with respect to the mechanism support portion 69 with the support shaft 71 being a fulcrum, and the gear portion 77 of the antenna holder 73 intermeshes with the operation gear 54 attached to the panel surface portion 43 of the panel 41.

A push arm 79 is rotatably supported by the mechanism support portion 69 on an outer surface side. The push arm 79 includes a to-be-operated protrusion portion 79a protruding substantially upwardly, an operation protrusion portion 79b protruding sideways, and a spring coupling protrusion portion 79c protruding sideways. In the push arm 79, the operation protrusion portion 79b is inserted into the insertion arrangement hole 69a from the outer surface side of the mechanism support portion 69.

A driving arm 80 is rotatably supported by the mechanism support portion 69 on the outer surface side. A rotational fulcrum of the push arm 79 with respect to the mechanism support portion 69 and a rotational fulcrum of the driving arm 80 are the same. With an upper end portion serving as a rotational fulcrum, the driving arm 80 includes, at the lower end portion thereof, a spring coupling portion 80a protruding sideways and a protrusion portion 80b protruding sideways and also downwardly. An operation pin 80c is attached to a portion slightly lower than the upper end portion of the driving arm 80. In the driving arm 80, the spring coupling portion 80a and the protrusion portion 80b are inserted into the insertion arrangement hole 69a from the outer surface side of the mechanism support portion 69.

A tension spring 81 is coupled to the spring coupling protrusion portion 79c of the push arm 79 and the spring coupling portion 80a of the driving arm 80. Therefore, the push arm 79 and the driving arm 80 are biased in the rotational direction in which the respective lower end portions approach each other.

A gear arm 82 is rotatably supported by the mechanism support portion 69 on the inner surface side. The gear arm 82 includes a substantially U-shaped base surface portion 82a opened rearwardly, a coupling protrusion portion 82b protruding sideways from a rear end portion of the lower end portion of the base surface portion 82a, and a gear portion 82c protruding from the base surface portion 82a. An interlocking pin 82d is attached to the rear end portion of the upper end portion of the gear arm 82.

The gear arm 82 is rotatably supported by the mechanism support portion 69 with the rear end portion of the lower end portion of the base surface portion 82a being a rotational fulcrum. A spring member 83 is coupled to the coupling protrusion portion 82b of the gear arm 82 and the spring-hooking protrusion portion 69b of the mechanism support portion 69. Therefore, the gear arm 82 is biased in the rotational direction in which the interlocking pin 82d is moved substantially rearwardly by the spring member 83.

The gear portion 82c of the gear arm 82 intermeshes with a lower-side opening/closing gear 53 that is supported by the side surface portion 45 of the panel 41.

The cam driving body 56 is formed by coupling a coupling frame 84 and cam sliders 85, 85 (see FIGS. 10 and 11).

The coupling frame 84 is constituted of an attachment surface portion 84a facing the vertical direction and coupling surface portions 84b, 84b that respectively protrude upwardly from left- and right-hand both side edges of the attachment surface portion 84a. A rack gear 86 functioning as a driving member is attached to an upper surface of the attachment surface portion 84a of the coupling frame 84.

The cam sliders 85, 85 are each formed in a plate shape that faces the lateral direction, and lower end portions of the cam sliders 85, 85 are respectively coupled to the coupling surface portions 84b, 84b of the coupling frame 84. A part of a peripheral edge of the cam sliders 85, 85 on a front end side is a tilted edge that is displaced downwardly toward the front side, and a part of the tilted edge of one of the cam sliders 85, 85 is provided as an operation portion 85a.

In the cam slider 85, cam holes 87, 87 are formed while being spaced apart from each other in the front-back direction. The cam hole 87 is constituted of a linear portion 87a extending in the front-back direction and a tilted portion 87b that is tilted so as to be displaced downwardly toward the front side, and a front end portion of the linear portion 87a and an upper end portion of the tilted portion 87b are continuous. Supported holes 88, 88 extending in the front-back direction are formed at the lower end portion of the cam slider 85 while being set apart from each other in the front-back direction.

In the cam driving body 56, the support pins 60c, 60c, . . . slidably engage with the supported holes 88, 88, . . . of the cam sliders 85, 85, respectively, so that the cam driving body 56 is supported by the support frame 55 while being movable in the front-back direction.

In a state where the cam driving body 56 is supported by the support frame 55, the intermediate gear 63 of the movement mechanism intermeshes with the gear portion 86a of the rack gear 86 (see FIG. 13). Therefore, when the worm 65, the intermediate gear 64, and the intermediate gear 63 are rotated by the drive of the elevating motor 62, the rack gear 86 is moved in the front-back direction in accordance with the rotational direction of the elevating motor 62, and the cam driving body 56 is moved in the front-back direction with respect to the support frame 55 along with the movement of the rack gear 86.

Further, in a state where the cam driving body 56 is supported by the support frame 55, the coupling pin 66b of the linear sensor 66 is coupled to the rack gear 86. Therefore, the linear sensor 66 detects a position of the cam driving body 56 in the front-back direction via the rack gear 86.

The disk holder 57 is constituted of an upper holder 89 and a lower holder 90 (see FIGS. 10 and 11).

The upper holder 89 includes an upper surface portion 91 facing the vertical direction, side surface portions 92, 92 respectively protruding downwardly from both left- and right-hand side edges of the upper surface portion 91, and a rear surface portion 93 protruding downwardly from a rear edge of the upper surface portion 91.

An operation mechanism (not shown) such as a rack and a gear is arranged on the upper surface of the upper surface portion 91.

Guided pins 92a, 92a protruding sideways are provided on the outer surface of the side surface portion 92 while being set apart from each other in the front-back direction. On the front end portions of the side surface portions 92, 92, release pieces 92b, 92b protruding in directions in which they approach each other are provided.

On the rear surface portion 93, lock release protrusion portions 93a, 93a are provided while being set apart from each other in the lateral direction. The lock release protrusion portions 93a, 93a protrude forwardly.

The upper holder 89 is supported by the support frame 55 while being movable in the front-back direction by the guided pins 92a, 92a, . . . being respectively inserted into the guide holes 60a, 60a from the inner surface side of the side surface plate portions 60, 60.

The lower holder 90 is constituted of a lower plate portion 94 facing the vertical direction and side plate portions 95, 95 respectively protruding upwardly from both left- and right-hand side edges of the lower plate portion 94.

Spring support protrusion portions 94a, 94a, . . . are provided in the lower plate portion 94 by bending respective portions downwardly. For example, 4 spring support protrusion portions 94a, 94a, are provided while being set apart from one another in the front-back direction and the lateral direction.

Guided pins 95a, 95a protruding sideways are provided on the outer surface of the side plate portion 95 while being set apart from each other in the front-back direction.

The guided pins 95a, 95a, . . . of the lower holder 90 are respectively inserted into the guide holes 60b, 60b, . . . and the cam holes 87, 87, . . . from the inner surface side of the side surface plate portions 60, 60 of the support frame 55, so as to be supported by the side surface plate portions 60, 60 and the cam sliders 85, 85 of the cam driving body 56 while being movable in the vertical direction.

The top plate 58 is formed in a substantially rectangular shape, and a motor holding portion 58a is provided at a rear end portion thereof. A driving motor 96 is held by the motor holding portion 58a. A worm gear 97 is coupled to a motor shaft of the driving motor 96.

Left- and right-hand both end portions of the top plate 58 are respectively attached to the upper end portions of the side surface plate portions 60, 60 of the support frame 55, and the disk holder 57 is covered from above by the top plate 58. In a state where the top plate 58 is attached to the side surface plate portions 60, 60, the worm gear 97 intermeshes with a gear of the operation mechanism arranged on the upper surface of the upper holder 89. Therefore, when the driving motor 96 is rotated, the operation mechanism is operated so that the rack of the operation mechanism is moved in the front-back direction and the upper holder 89 is moved in the front-back direction.

Bias springs 98, 98, . . . are respectively supported between the spring support protrusion portions 94a, 94a, . . . of the lower holder 90 and the spring-hooking protrusion portions 59a, 59a, . . . of the bottom surface plate portion 59 of the support frame 55. Therefore, the lower holder 90 is biased upwardly by the bias springs 98, 98, . . . so that the guided pins 95a, 95a, . . . of the lower holder 90 are pressed against upper-side opening edges of the cam holes 87, 87 of the cam sliders 85, 85 from below.

As described above, in the disk conveyor apparatus 40, the bias springs 98, 98, . . . that press the lower holder 90 against the cam sliders 85, 85 as the movement mechanism are provided. Therefore, the guided pins 95a, 95a, . . . of the lower holder 90 are moved while being pressed against the upper-side opening edges of the cam holes 87, 87 of the cam sliders 85, 85 from below, with the result that a backlash of the lower holder 90 with respect to the cam sliders 85, 85 is prevented, and positioning accuracy of the movement position of the lower holder 90 and the disk cartridge 1 held by the lower holder 90 can be improved.

Further, the lower holder 90 is moved downwardly from an upper movement end to a predetermined movement position, and the lower holder 90 is moved in the state where the guided pins 95a, 95a, . . . are pressed against the upper-side opening edges of the cam holes 87, 87, . . . from below.

Therefore, since the lower holder 90 is moved toward the movement position while being biased in a direction opposite to the movement direction toward the movement position, the guided pins 95a, 95a, . . . are reliably pressed against the upper-side opening edges of the cam holes 87, 87, . . . during the movement toward the movement position, and thus the positioning accuracy regarding the movement position of the lower holder 90 can be improved.

It should be noted that although the example where the lower holder 90 is moved downwardly from the upper movement end to the predetermined movement position is described in the descriptions above, a configuration in which, conversely, the disk-shaped recording media 100, 100, . . . are held by the upper holder 89 and the upper holder 89 is moved upwardly from a lower movement end to a predetermined movement position is also possible. In this case, by adopting a configuration in which the upper holder 89 is moved toward the movement position while being biased downwardly, the upper holder 89 is reliably pressed against the cam sliders 85, 85 during the movement toward the movement position, and thus it becomes possible to improve the positioning accuracy regarding the movement position of the upper holder 89.

For example, a torsion coil spring is used as the bias springs 98, 98, . . . .

By using a torsion coil spring as the bias springs 98, 98, . . . , a difference in the bias forces among the bias springs 98, 98, . . . due to the movement position of the lower holder 90 becomes small, and thus a difference in loads with respect to the movement mechanism due to the movement position of the lower holder 90 can be made small.

In the rear surface portion of the apparatus body 42, positioning holes 99, 99 that are opened rearwardly are formed while being set apart from each other in the lateral direction (see FIG. 7).

<Overall Configuration of Disk Drive Apparatus>

Next, a schematic configuration of the disk drive apparatus 150 will be described (see FIGS. 6 and 7).

The disk drive apparatus 150 includes a structure body 151 constituted of necessary parts, and the structure body 151 includes a drive unit 152 including a disk table, an optical pickup, and the like and a disk insertion portion 153 arranged on an upper side of the drive unit 152. The disk insertion portion 153 is a portion where the disk-shaped recording medium 100 conveyed from the disk conveyor apparatus 40 is inserted and arranged, and is displaceable with respect to other portions including the drive unit 152 in the vertical direction.

It should be noted that the disk insertion portion 153 may be rotatable so that a front end portion thereof is displaced with respect to other portions including the drive unit 152 in the vertical direction.

Positioning pins 153a, 153a are provided on a front surface portion of the disk insertion portion 153 while being set apart from each other in the lateral direction.

As described above, the apparatus body 42 of the disk conveyor apparatus 40 and the disk drive apparatus 150 are respectively arranged in the conveyor arrangement portion 203a and drive arrangement portion 203b of the base frame 203. At this time, in a state where the disk drive apparatus 150 is arranged in the drive arrangement portion 203b, the apparatus body 42 is arranged in the conveyor arrangement portion 203a, and the positioning pins 153a, 153a of the disk insertion portion 153 are respectively inserted into the positioning holes 99, 99 of the apparatus body 42.

When the positioning pins 153a, 153a are respectively inserted into the positioning holes 99, 99, the disk insertion portion 153 is displaced with respect to the other portions including the drive unit 152 in the vertical direction, and positioning of the apparatus body 42 and the disk insertion portion 153 is performed.

In the state where the apparatus body 42 and the disk insertion portion 153 are positioned in this way, the disk insertion portion 153 is fixed to the drive unit 152 by screwing or the like.

As described above, since the disk insertion portion 153 of the disk drive apparatus 150 can be displaced with respect to the other portions including the drive unit 152 in the vertical direction, the disk insertion portion 153 is displaced in the vertical direction in accordance with the position of the apparatus body 42, and thus an improvement of the positioning accuracy of the apparatus body 42 and the disk insertion portion 153 can be secured by a simple task.

It should be noted that although the example in which the positioning holes 99, 99 are formed in the apparatus body 42 and the positioning pins 153a, 153a are provided in the disk insertion portion 153 is described in the descriptions above, conversely, it is also possible to provide the positioning pins in the apparatus body 42 and form the positioning holes in the disk insertion portion 153.

<Operation of Disk Conveyor Apparatus>

Hereinafter, operations of the disk conveyor apparatus 40 will be described (see FIGS. 16 to 26).

Figure 16:
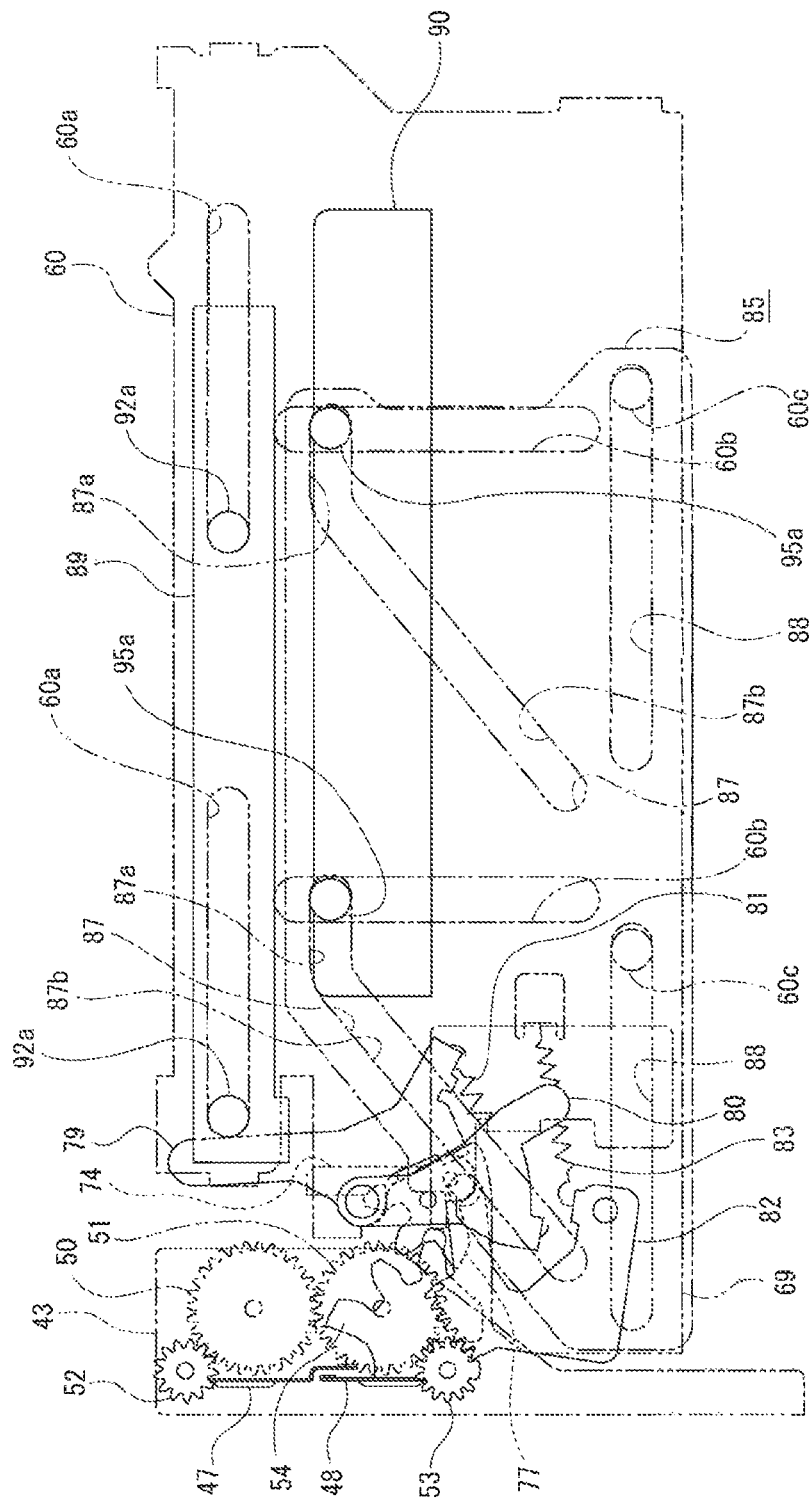
FIG. 16 A schematic side view showing an operation of the disk conveyor apparatus together with FIGS. 17 to 26, the view showing a state before the disk cartridge is inserted into the disk conveyor apparatus.
Figure 17:
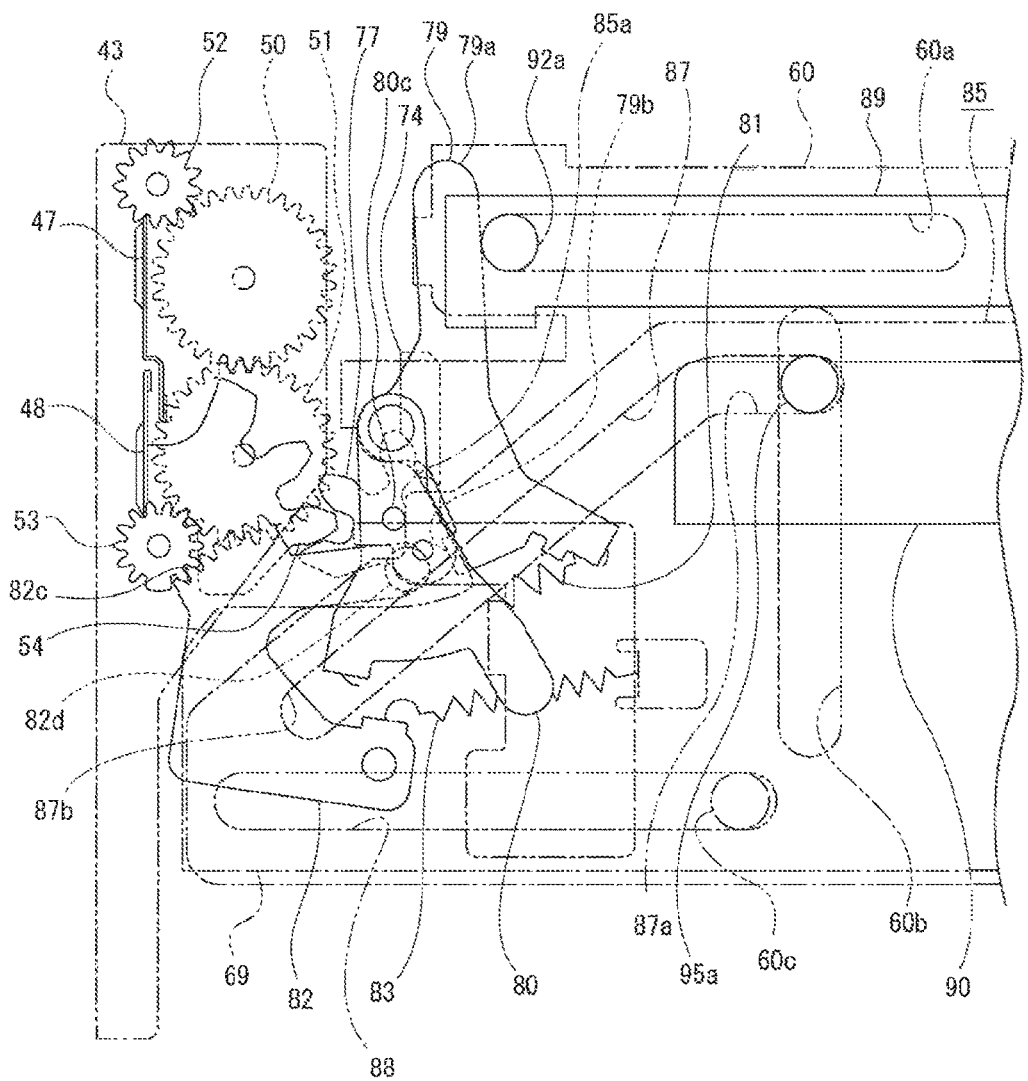

First, an initial state before the disk cartridge 1 is inserted into the disk conveyor apparatus 40 will be described (see FIGS. 16 and 17).

In the initial state, both the upper-side opening/closing plate 47 and lower-side opening/closing plate 48 of the shutter 46 are at a closed position, and the cartridge insertion/ejection port 43*a* of the panel 41 is closed.

Since the gear portion 77 of the antenna unit 72 is intermeshed with the operation gear 54 and the lower-side opening/closing plate 48 to which the operation gear 54 is attached is at the closed position, the antenna substrate 74*a* is in a vertical state.

The gear arm 82 is biased by the spring member 83 in a state where the gear portion 82*c* is intermeshed with the lower-side opening/closing gear 53 supported by the panel 41, and the interlocking pin 82*d* is positioned at a rearmost position.

The cam sliders 85, 85 are positioned at a front movement end, and the upper holder 89 of the disk holder 57 is positioned at the front movement end while the lower holder 90 thereof is positioned at the upper movement end.

At this time, the guided pins 92*a*, 92*a* of the upper holder 89 are engaged with the front end portions of the guide holes 60*a*, 60*a* in the side surface plate portion 60. In the lower holder 90, the guided pins 95*a*, 95*a* are engaged with the upper end portions of the guide holes 60*b*, 60*b* in the support frame 55 and the linear portions 87*a*, 87*a* of the cam holes 87, 87 in the cam slider 85.

As described above, since the cam slider 85 is positioned at the forward movement end in the initial state, the operation pin 85*c* of the driving arm 80 is pressed forward by the operation portion 85*a*. Accordingly, the driving arm 80 is positioned at the forward rotation end.

Further, since the upper holder 89 is positioned at the forward movement end, the to-be-operated protrusion portion 79*a* of the push arm 79 is pressed forward by the guided pin 92*a*. Accordingly, the push arm 79 is positioned at one of the rotation ends, and the operation protrusion portion 79*b* is positioned at the rearmost position.

The feeding lever 68 coupled to the coupling member 67 is held while extending substantially in the lateral direction, and the disk pressing portion 68*a* is located on a frontmost side.

Figure 18:
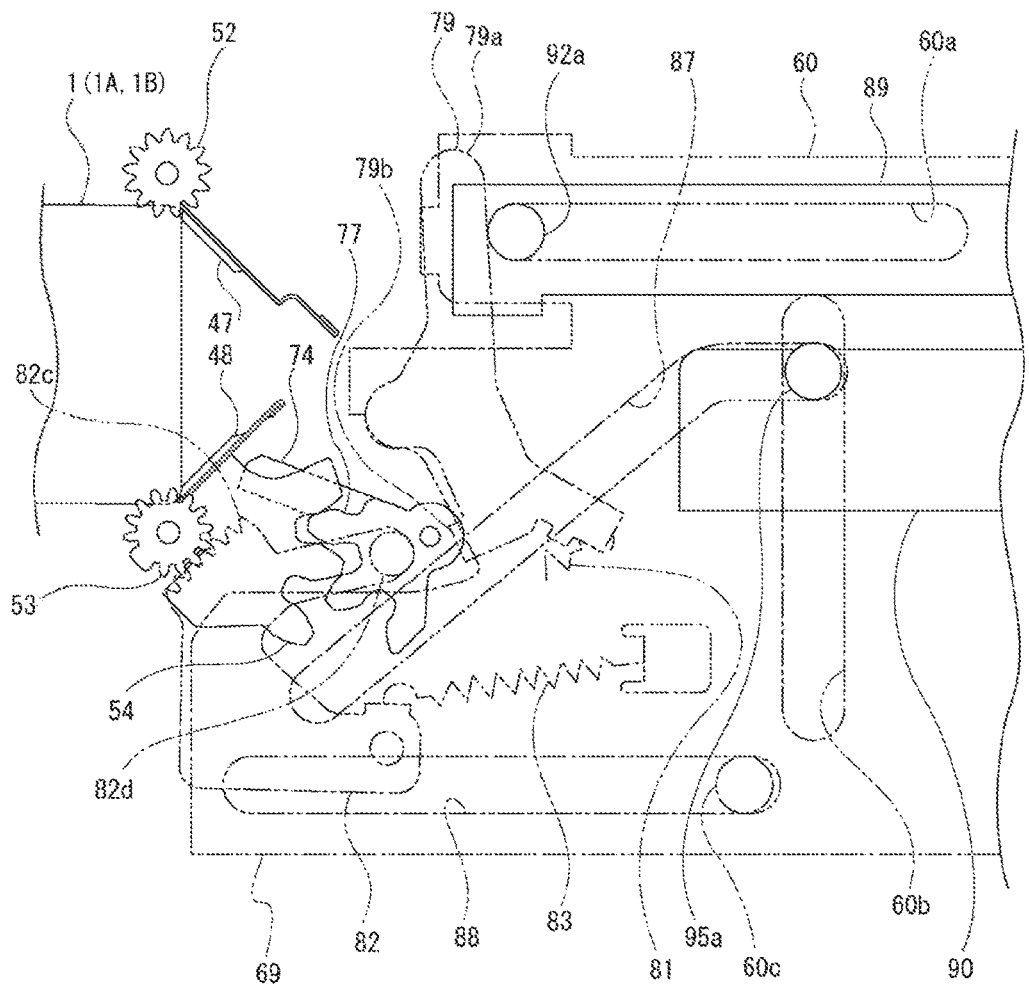
FIG. 18 A schematic enlarged side view showing a state where the disk cartridge is inserted into the disk conveyor apparatus.
Figure 19:
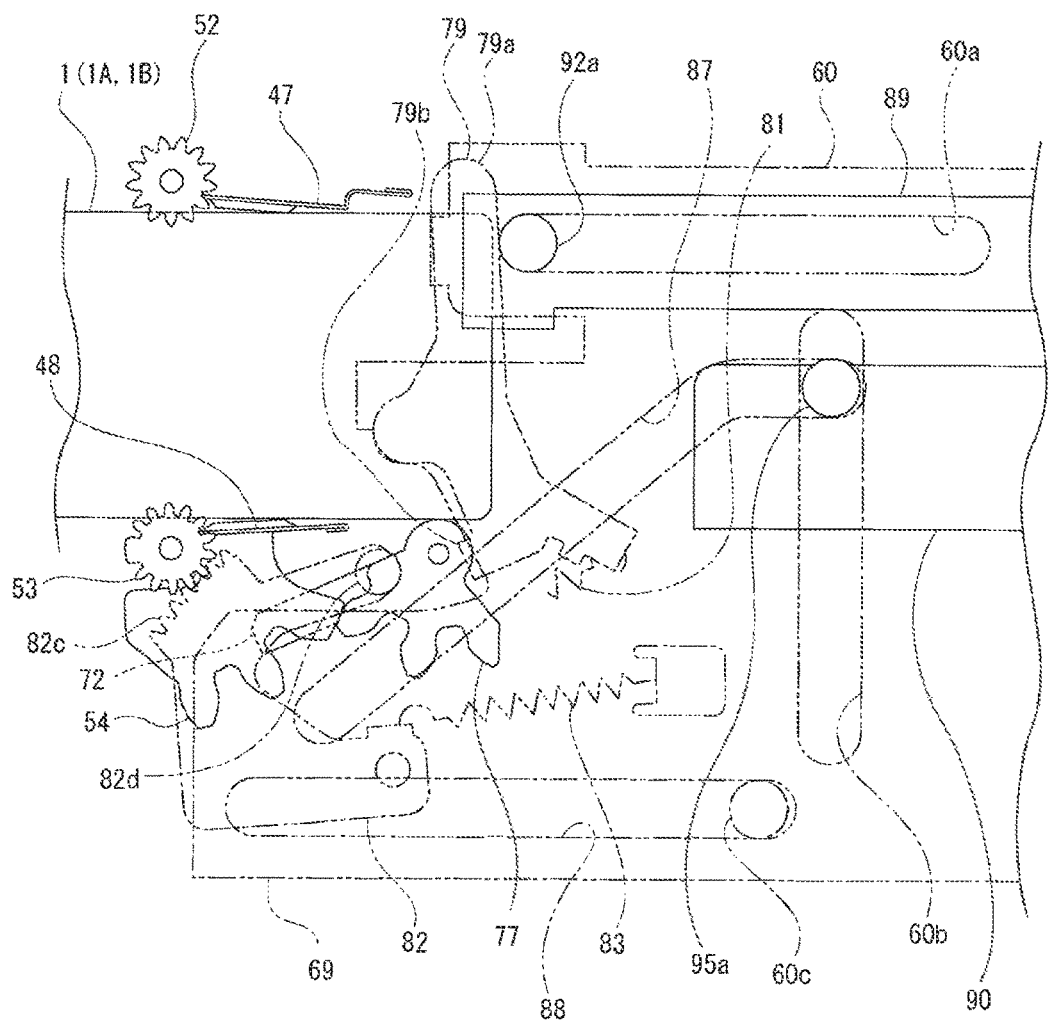
FIG. 19 A schematic enlarged side view showing a state where the disk cartridge is further inserted into the disk conveyor apparatus, following FIG. 18.

In the initial state described above, when the disk cartridge 1 is inserted into the cartridge insertion/ejection port 43*a* of the panel 41, the shutter 46 is pressed by the disk cartridge 1 (see FIG. 18). When the shutter 46 is pressed by the disk cartridge 1, the upper-side opening/closing plate 47 and the lower-side opening/closing plate 48 are synchronously rotated in directions in which they are separated from each other.

When the lower-side opening/closing plate 48 is rotated, the gear arm 82 is rotated against the bias force of the spring member 83 along with the rotation of the lower-side opening/closing gear 53. When the lower-side opening/closing plate 48 is rotated, the operation gear 54 is rotated simultaneously and is rotated forwardly until the antenna unit 72 becomes substantially horizontal.

Figure 20:
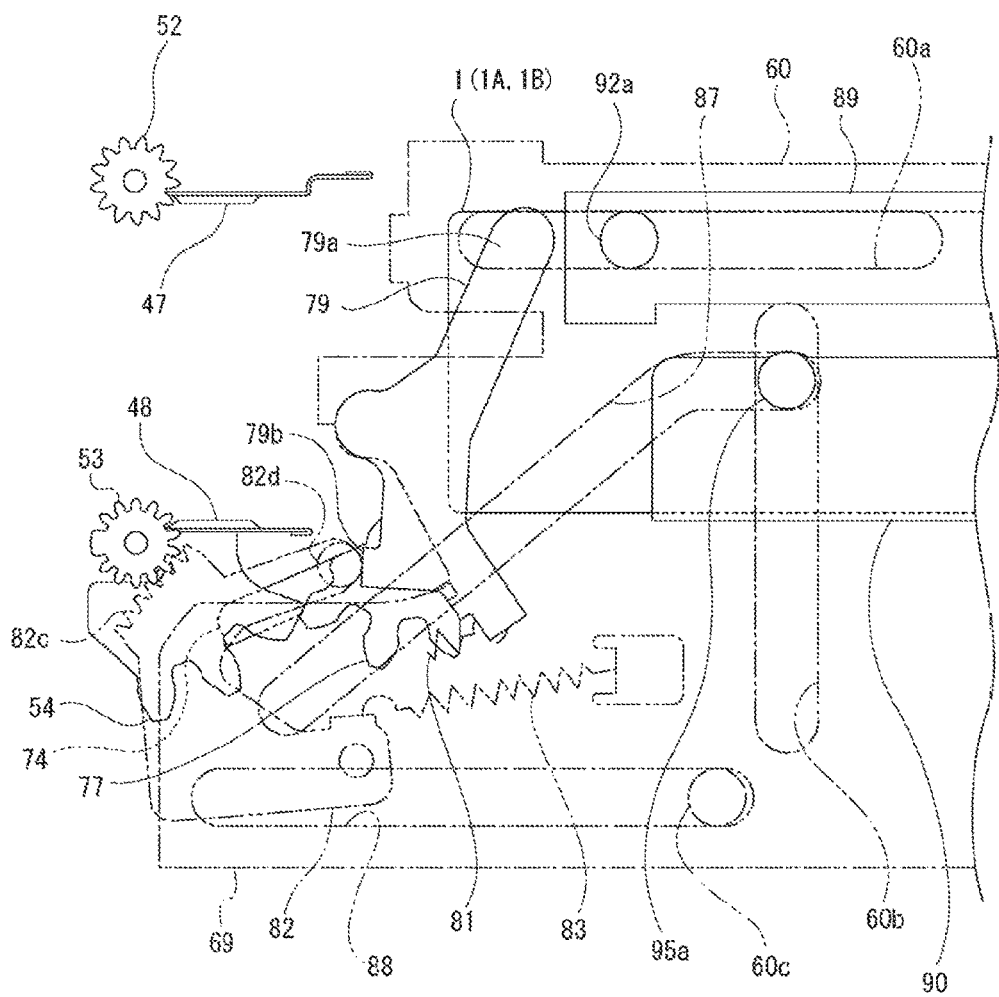
FIG. 20 A schematic enlarged side view showing a state where an upper holder is moved and a push arm is rotated, following FIG. 19.

The disk cartridge 1 that is moved rearwardly passes the upper side of the antenna unit 72 in the substantially-horizontal state to be inserted into the upper holder 89 from the front side (see FIG. 20). When the disk cartridge 1 is inserted into the upper holder 89, the release pieces 92*b*, 92*b* of the upper holder 89 are respectively inserted into the insertion grooves 2*a*, 2*a* formed in the case body 2.

When the release pieces 92*b*, 92*b* are respectively inserted into the insertion grooves 2*a*, 2*a*, the supported portions 19, 19 of the lock sliders 18, 18 are respectively pressed by the release pieces 92*b*, 92*b* at a time the disk cartridge 1 is moved to the back side of the upper holder 89. When the supported portions 19, 19 are pressed forward by the release pieces 92*b*, 92*b*, respectively, the lock sliders 18, 18 are respectively moved forward against the bias force of the coil springs 22, 22, and the lock portions 20, 20 are respectively drawn out of the second lock concave portions 29*b*, 29*b* of the second shell 4. When the lock portions 20, 20 are respectively drawn out of the second lock concave portions 29*b*, 29*b*, the lock of the first shell 3 and the second shell 4 by the lock sliders 18, 18 is released.

When the disk cartridge 1 is inserted into the upper holder 89, a switch (not shown) is operated by the disk cartridge 1, and the rotation of the driving motor 96 is started, so that the upper holder 89 holding the disk cartridge 1 is moved rearwardly by the operation mechanism.

When the upper holder 89 is moved rearwardly, the guided pin 92*a* is separated rearwardly from the to-be-operated protrusion portion 79*a* of the push arm 79 (see FIG. 20). When the guided pin 92*a* is separated from the to-be-operated protrusion portion 79*a*, the push arm 79 is rotated in a direction in which the operation protrusion portion 79*b* is moved forwardly by the bias force of the tension spring 81.

When the push arm 79 is rotated, the operation protrusion portion 79*b* comes into contact with the interlocking pin 82*d* of the gear arm 82.

Figure 21:
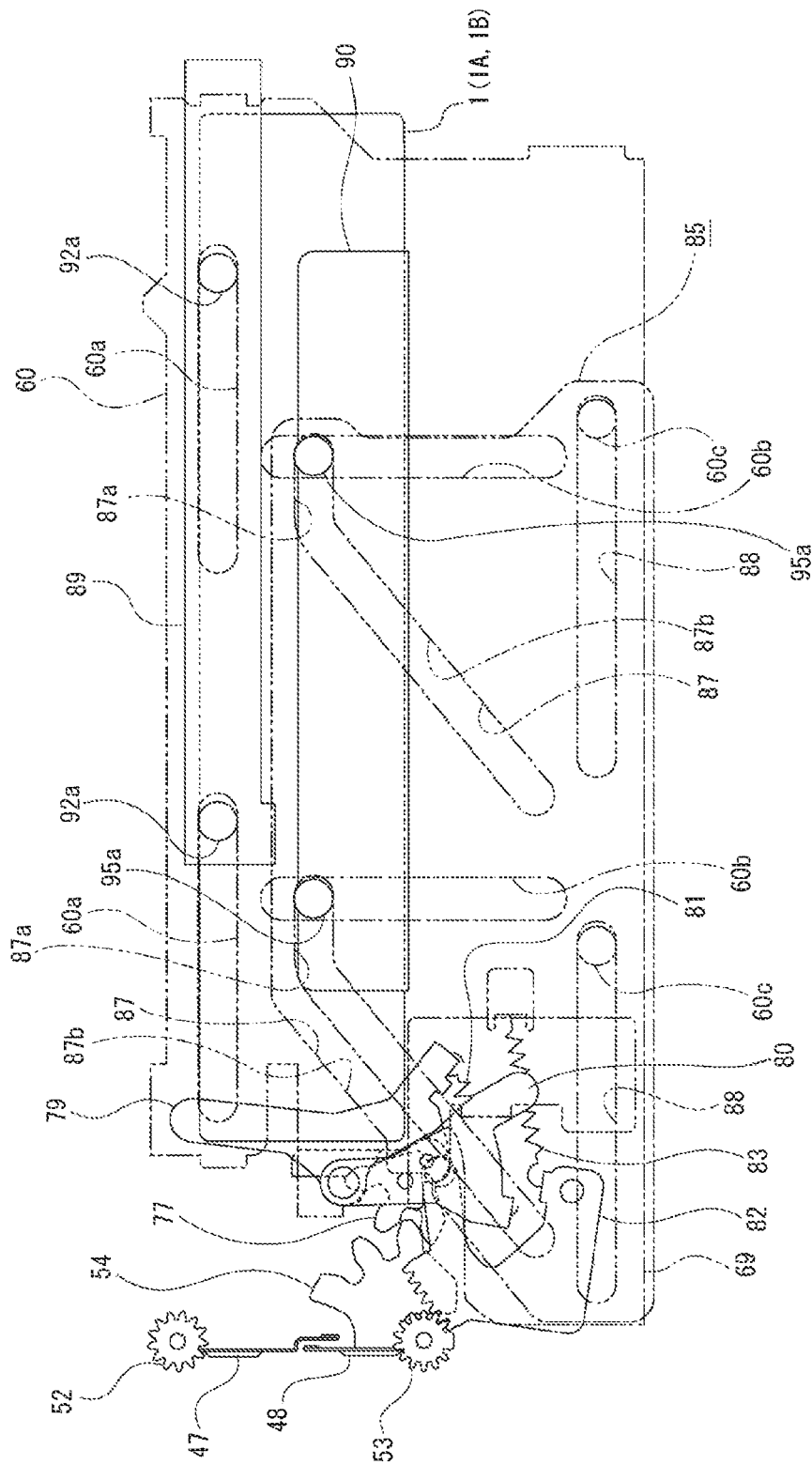
FIG. 21 A schematic side view showing a state where the disk cartridge is inserted into the disk holder, following FIG. 20.

The upper holder 89 holding the disk cartridge 1 is moved to the rear movement end, and a part (lower part) of the disk cartridge 1 is inserted into the lower holder 90 (see FIG. 21). When the part of the disk cartridge 1 is inserted into the lower holder 90, the lock release protrusion portions 93*a*, 93*a* provided in the upper holder 90 are respectively inserted into the insertion holes 24*a*, 24*a* of the opening/closing panel 23. When the lock release protrusion portions 93*a*, 93*a* are respectively inserted into the insertion holes 24*a*, 24*a*, the lock release portions 15, 15 of the lock levers 12, 12 are respectively pressed forward by the lock release protrusion portions 93*a*, 93*a*. When the lock release portions 15, 15 are respectively pressed forward by the lock release protrusion portions 93*a*, 93*a*, the lock levers 12, 12 are respectively rotated against the bias force of the bias springs 17, 17, and the lock portions 14, 14 are respectively drawn out from the first lock concave portions 29*a*, 29*a* of the second shell 4. When the lock portions 14, 14 are respectively drawn out from the first lock concave portions 29*a*, 29*a*, the lock of the first shell 3 and the second shell 4 by the lock levers 12, 12 is released.

When the lock of the first shell 3 and the second shell 4 by the lock levers 12, 12 and the lock sliders 18, 18 is released, the first shell 3 and the second shell 4 become separable in the vertical direction.

Figure 22:
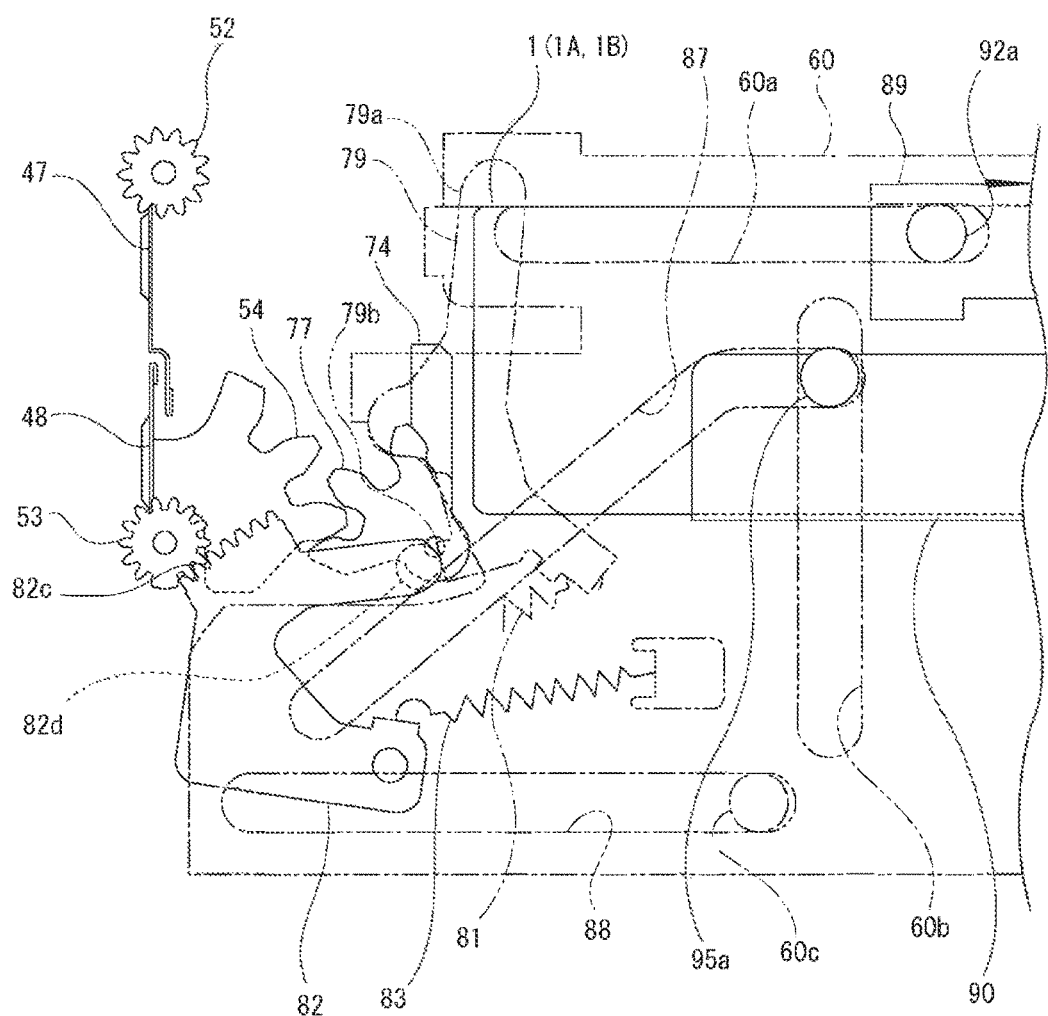
FIG. 22 A schematic enlarged side view showing a state where the upper holder is moved rearwardly and an antenna is rotated to a vertical state.

When the upper holder 89 is moved to the rear movement end, the disk cartridge 1 is set apart rearwardly from the upper-side opening/closing plate 47 and lower-side opening/closing plate 48 of the shutter 46 (see FIG. 22). Therefore, the gear arm 82 is rotated by the bias force of the spring member 83, the lower-side opening/closing gear 53 intermeshed with the gear portion 82*c* is rotated, and the upper-side opening/closing plate 47 and the lower-side opening/closing plate 48 are rotated in directions in which they approach each other along with the rotation of the lower-side opening/closing gear 53 to thus close the cartridge insertion/ejection port 43*a*.

At this time, since the gear arm 82 is rotated by the bias force of the spring member 83 and the interlocking pin 82*d* is moved rearwardly, the operation protrusion portion 79*b* of the push arm 79 is pressed by the interlocking pin 82*d*, and the push arm 79 is rotated against the bias force of the tension spring 81. The gear arm 82 and the push arm 79 are held in a state where the interlocking pin 82*d* and the operation protrusion portion 79*b* are in contact with each other.

At the same time, the lower-side opening/closing plate 48 is rotated so that the operation gear 54 is rotated rearwardly until the antenna unit 72 becomes vertical.

When the antenna 74 becomes vertical, the antenna substrate 74*a* opposes the information input sheet 31 attached to the case body 2 of the disk cartridge 1 via the reading opening 75*a* of the antenna holder 73. At this time, information input to the information input sheet 31 is read out by the antenna 74, and a judgment is made on which of the disk cartridge 1A or the disk cartridge 1B the disk cartridge 1 held by the disk holder 57 is.

Further, when the disk cartridge 1 is inserted into the disk holder 57, it is possible to insert an identification pin (not shown) into the identification hole of the disk cartridge 1. Therefore, on the basis of the presence/absence of the identification hole of the disk cartridge 1 inserted into the disk holder 57, which of the disk cartridge 1A or the disk cartridge 1B the inserted disk cartridge 1 is, is identified.

In this way, in the disk conveyor apparatus 40, since the type of the disk cartridge 1 is identified on the basis of a difference in the shape of the case body 2, that is, a difference in the shape due to the presence/absence of the identification hole, the movement position of the lower holder 90 is set on the basis of the difference in the shape of the case body 2, and thus the setting of the movement position of the lower holder 90 can be reliably performed with ease.

It should be noted that, if by any chance, difference results are obtained regarding the judgment result on the disk cartridge 1A or the disk cartridge 1B by the antenna 74 and the identification result on which of the disk cartridge 1A or the disk cartridge 1B the disk cartridge 1 is based on the presence/absence of the identification hole, the judgment result obtained by the antenna 74 is set to be prioritized over the identification result based on the presence/absence of the identification hole.

As described above, in the disk conveyor apparatus 40, information input to the information input sheet 31 is read out by the antenna 74 in a state where the antenna 74 opposes the information input sheet 31.

Therefore, a sensitivity of the antenna 74 with respect to the information input sheet 31 becomes high, and reading accuracy of information input to the information input sheet 31 can be improved.

Further, when the disk cartridge 1 is inserted into the disk conveyor apparatus 40, the disk cartridge 1 is rotated forwardly until the antenna unit 72 becomes substantially horizontal.

Therefore, since the antenna unit 72 is evacuated from the movement path of the disk cartridge 1, the disk cartridge 1 does not interfere with the antenna unit 72, and a favorable movement operation of the disk cartridge 1 can be secured.

Figure 23:
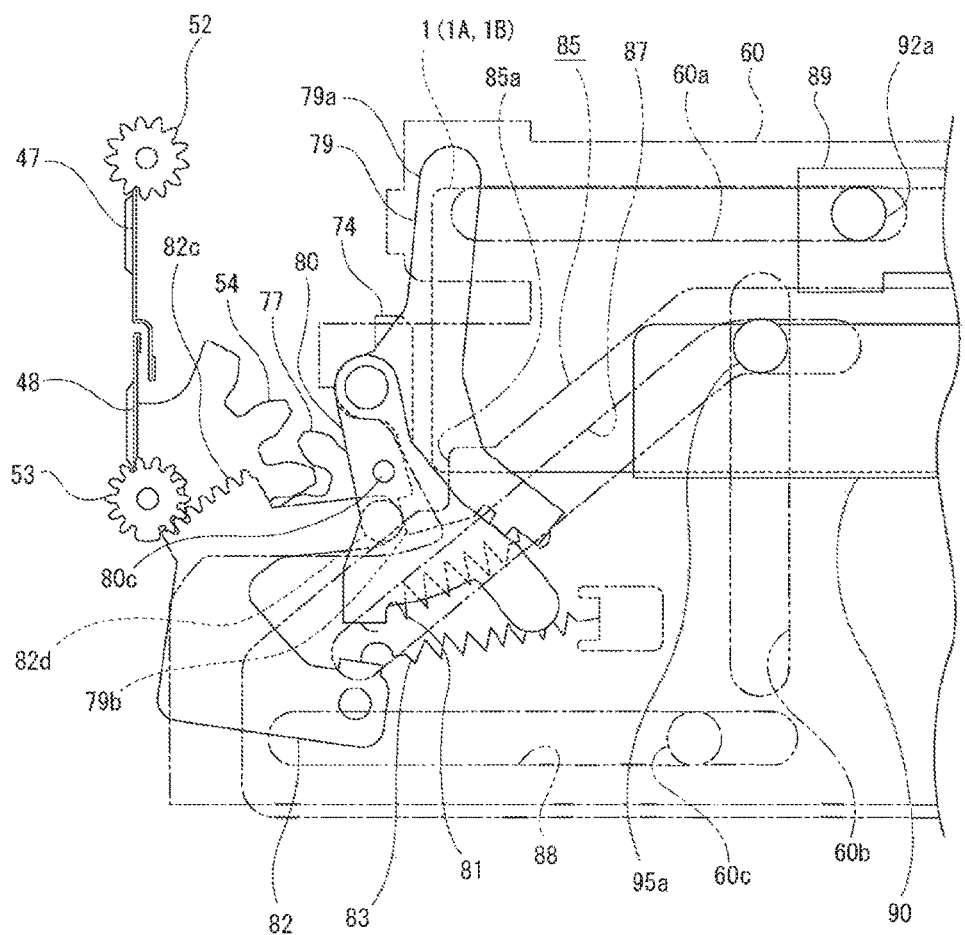
FIG. 23 A schematic side view showing a state where a cam slider is moved and a driving arm is rotated, following FIG. 22.
Figure 24:
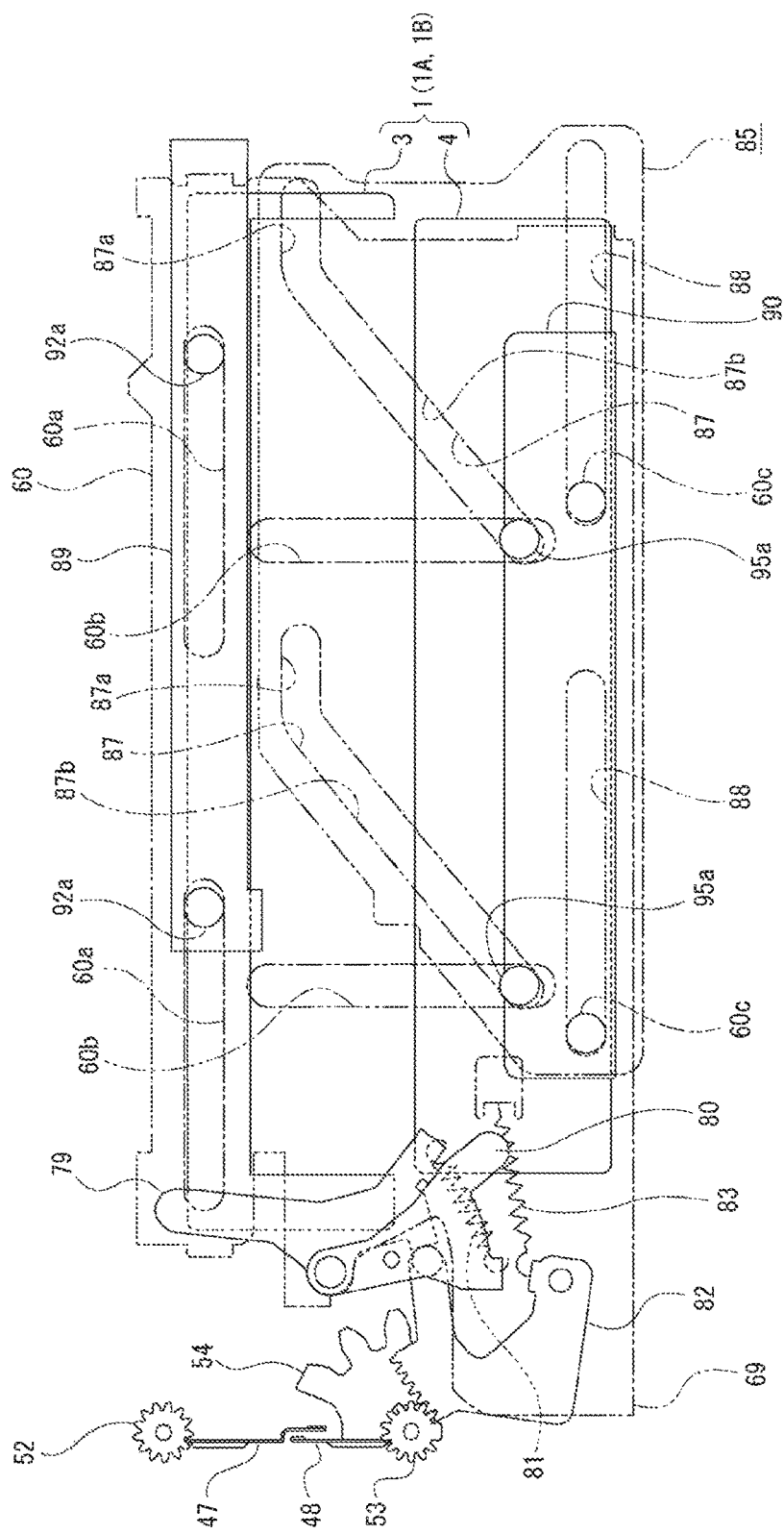
FIG. 24 A schematic side view showing a state where a lower holder is moved downward, following FIG. 21.

When the upper holder 89 is moved to the rear movement end, the rotation of the elevating motor 62 is started, and a driving force of the elevating motor 62 is transmitted to the cam sliders 85, 85 via the rack gear 86 and the coupling frame 84 so that the cam sliders 85, 85 are moved rearwardly with respect to the support frame 55 (see FIG. 23). By the supported holes 88, 88 being guided by the support pins 60*c*, 60*c* of the side surface plate portion 60, the cam slider 85 is moved rearwardly.

When the cam slider 85 is moved rearwardly, the operation portion 85*a* is set apart rearwardly from the operation pin 80*c* of the driving arm 80. Therefore, the driving arm 80 is rotated rearwardly by the bias force of the tension spring 81.

When the cam slider 85 is moved rearwardly, the guided pins 95*a*, 95*a* of the lower holder 90 are moved downwardly along the tilted portions 87*b*, 87*b* of the cam holes 87, 87 (see FIG. 23). At this time, the lower holder 90 is moved downwardly since the guided pins 95*a*, 95*a* are guided by the guide holes 60*b*, 60*b* of the side surface plate portion 60.

When the upper holder 89 is moved to the rear movement end, the first shell 3 of the disk cartridge 1 is held by the upper holder 89, and the second shell 4 is held by the lower holder 90. Thus, the second shell 4 holding the disk-shaped recording media 100, 100, . . . is moved downward integrally with the lower holder 90 without the first shell 3 being moved downwardly. Therefore, the first shell 3 and the second shell 4 are separated.

As described above, in the disk conveyor apparatus 40, the cam sliders 85, 85 that slidably support the guided pins 95*a*, 95*a*, . . . of the lower holder 90 are provided, and the lower holder 90 is moved in a direction orthogonal to the movement direction of the cam sliders 85, 85 by the movement of the cam sliders 85, 85.

Therefore, since the lower holder 90 and the cam sliders 85, 85 are moved in mutually-orthogonal directions, a movement space of the lower holder 90 in the movement direction becomes small, and thus the disk conveyor apparatus 40 can be downsized.

Further, the pair of cam sliders 85, 85 are arranged on both sides of the lower holder 90, and the coupling frame 84 that couples the pair of cam sliders 85, 85 is provided.

Therefore, since the lower holder 90 is moved by a synchronous movement of the pair of cam sliders 85, 85 that are arranged on both sides of the lower holder 90 and coupled by the coupling frame 84, the lower holder 90 is moved without being tilted, and positioning accuracy regarding the movement position of the lower holder 90 can be improved.

When the cam sliders 85, 85 are moved rearwardly and the lower holder 90 is moved downwardly as described above, the rack gear 86 is fed, and the position of the cam driving body 56 in the front-back direction is detected by the linear sensor 66 via the rack gear 86. The lower holder 90 is moved downwardly to a set predetermined movement position by the elevating motor 62 being controlled on the basis of the information read out from the information input sheet 31 of the disk cartridge 1.

When the lower holder 90 is stopped at a predetermined position, the operation of the feeder mechanism is started, and the feeding lever 68 is rotated. When the feeding lever 68 is rotated, the outer circumferential surface of the disk-shaped recording medium 100 present at a height corresponding to the stop position of the lower holder 90 is pressed rearwardly by the disk pressing portion 68*a* of the feeding lever 68, and the pressed disk-shaped recording medium 100 is fed from the second shell 4 to the disk insertion portion 153 of the disk drive apparatus 150.

In the state where the lower holder 90 is moved to the predetermined movement position as described above, the disk-shaped recording medium 100 is fed toward the disk drive apparatus 150 by the feeding lever 68 as the feeder mechanism.

Therefore, since the disk-shaped recording medium 100 is fed by the feeding lever 68 in the state where the lower holder 90 is moved to the set predetermined movement position, an appropriate height of the disk-shaped recording medium 100 with respect to the disk drive apparatus 150 is secured, and the disk-shaped recording medium 100 can be reliably fed to a predetermined insertion position of the disk drive apparatus 150.

Information signals are recorded or reproduced onto/from the disk-shaped recording medium 100 fed to the disk insertion portion 153 by the drive unit 152.

When the disk-shaped recording medium 100 is fed to the disk insertion portion 153, the feeding lever 68 is rotated to its original position.

When the ejection button 49 arranged on the panel 41 of the outer casing 201 is operated, the disk-shaped recording medium 100 for which the recording or reproduction of information signals has been completed is ejected from the drive unit 152 and an ejection operation is started by a disk ejection mechanism (not shown). The disk-shaped recording medium 100 ejected by the disk ejection mechanism is held again by the holding grooves 29c, 29c present at a predetermined position of the second shell 4.

When the disk-shaped recording medium 100 is held by the second shell 4, an inverse rotation of the elevating motor 62 is started, and the cam sliders 85, 85 are moved forwardly with respect to the side surface plate portions 60, 60.

When the cam sliders 85, 85 are moved forwardly, the guided pins 95a, 95a of the lower holder 90 are moved upwardly in the tilted portions 87b, 87b of the cam holes 87, 87 and moved upwardly by being guided by the guide holes 60b, 60b of the support frame 55, and the lower holder 90 holding the disk-shaped recording media 100, 100, . . . is moved integrally with the second shell 4 to the upper movement end.

Figure 25:
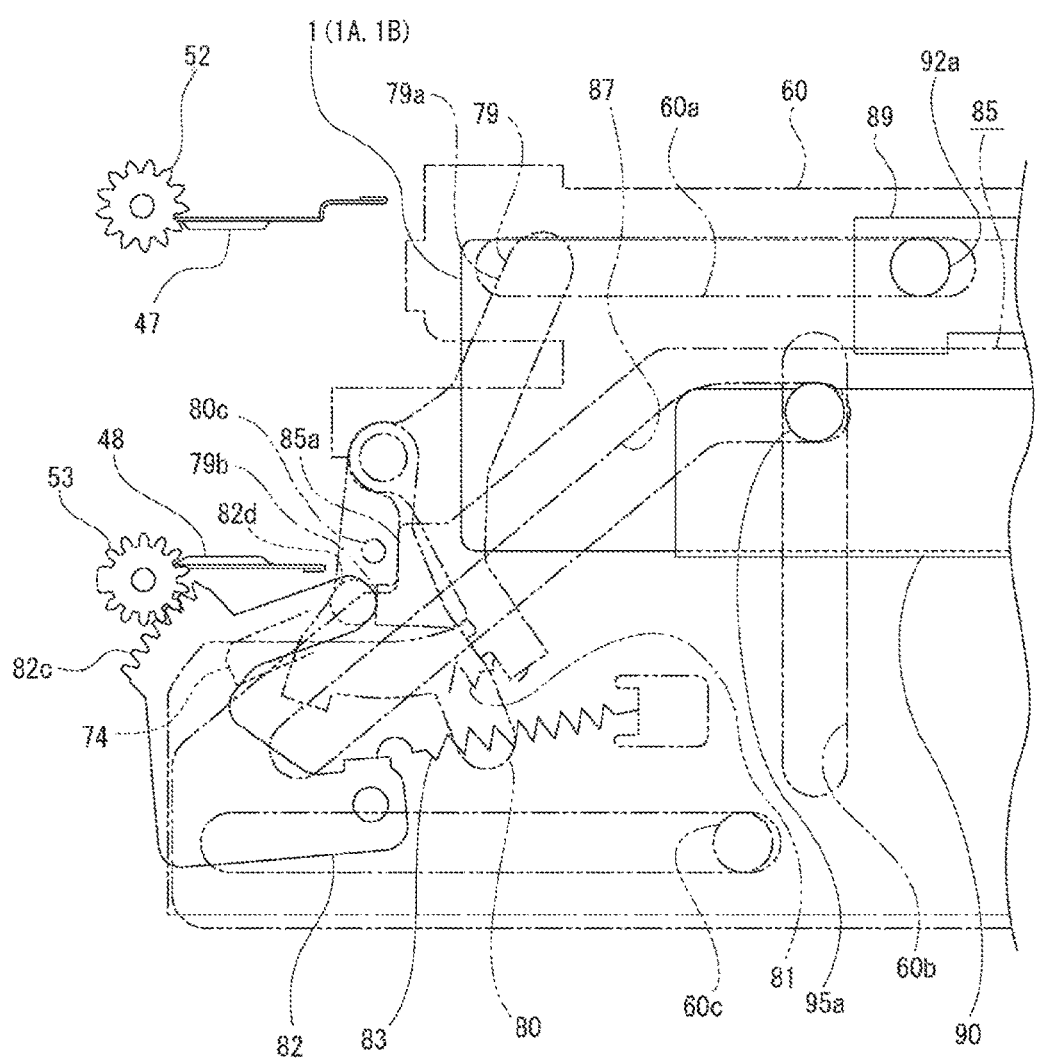
FIG. 25 A schematic enlarged side view showing a state where an ejection operation is started, the cam slider is moved forward, and the push arm, the driving arm, and a gear arm are rotated to open a shutter.

When the cam slider 85 is moved to the forward movement end, the operation pin 85c of the driving arm 80 is pressed from behind by the operation portion 85a (see FIG. 25). Therefore, the driving arm 80 is rotated forwardly against the bias force of the tension spring 81.

When the driving arm 80 is rotated forwardly, the push arm 79 coupled by the tension spring 81 is rotated in a direction in which the operation protrusion portion 79b is moved forward along with the rotation of the driving arm 80. At this time, since the operation protrusion portion 79b is in contact with the interlocking pin 82d of the gear arm 82, the interlocking pin 82d is pressed from behind by the operation protrusion portion 79b, and the gear arm 82 is rotated against the bias force of the spring member 83.

As the gear arm 82 is rotated, the lower-side opening/closing gear 53 is rotated, and the upper-side opening/closing plate 47 and the lower-side opening/closing plate 48 are rotated in the directions in which they are set apart from each other so as to open the cartridge insertion/ejection port 43a. At this time, as the lower-side opening/closing plate 48 is rotated, the operation gear 54 is rotated so as to rotate the antenna unit 72 forwardly until it becomes substantially horizontal.

It should be noted that in the descriptions above, the example where the push arm 79, the driving arm 80, the gear arm 82, and the like are rotated to open/close the shutter 46 has been described. However, in the disk conveyor apparatus 40, for example, an auxiliary spring that imparts a bias force to the upper-side opening/closing plate 47 or the lower-side opening/closing plate 48 in a rotational direction may be provided in addition to the push arm 79, the driving arm 80, the gear arm 82, and the like, to thus open/close the shutter 46. Specifically, it is possible to adopt a configuration in which, when the shutter 46 is rotated from the closed position to the predetermined position by the push arm 79, the driving arm 80, the gear arm 82, and the like, a bias force in a direction toward the open position is applied to the shutter 46 by the auxiliary spring, and the shutter 46 is rotated from the predetermined position to the open position by the bias force of the auxiliary spring. Further, it is also possible to adopt a configuration in which, when the shutter 46 is rotated from the open position to the predetermined position by the push arm 79, the driving arm 80, the gear arm 82, and the like, a bias force in a direction toward the closed position is applied to the shutter 46 by the same auxiliary spring, and the shutter 46 is rotated from the predetermined position to the closed position by the bias force of the auxiliary spring.

When the lower holder 90 is moved to the upper movement end, the upper holder 89 is positioned at the rear movement end, and the second shell 4 held by the lower holder 90 is coupled to the first shell 3.

When the lower holder 90 is moved to the upper movement end, the upper holder 89 is moved forward integrally with the disk cartridge 1. As the upper holder 89 is moved forwardly, a part of the disk cartridge 1 protrudes forward from the cartridge insertion/ejection port 43a.

When the part of the disk cartridge 1 protrudes forwardly from the cartridge insertion/ejection port 43a, the antenna unit 72 is rotated to the front side to become substantially horizontal.

Therefore, since the antenna unit 72 is evacuated from the movement path of the disk cartridge 1, the disk cartridge 1 does not interfere with the antenna unit 72, and a favorable movement operation of the disk cartridge 1 can be secured.

Figure 26:
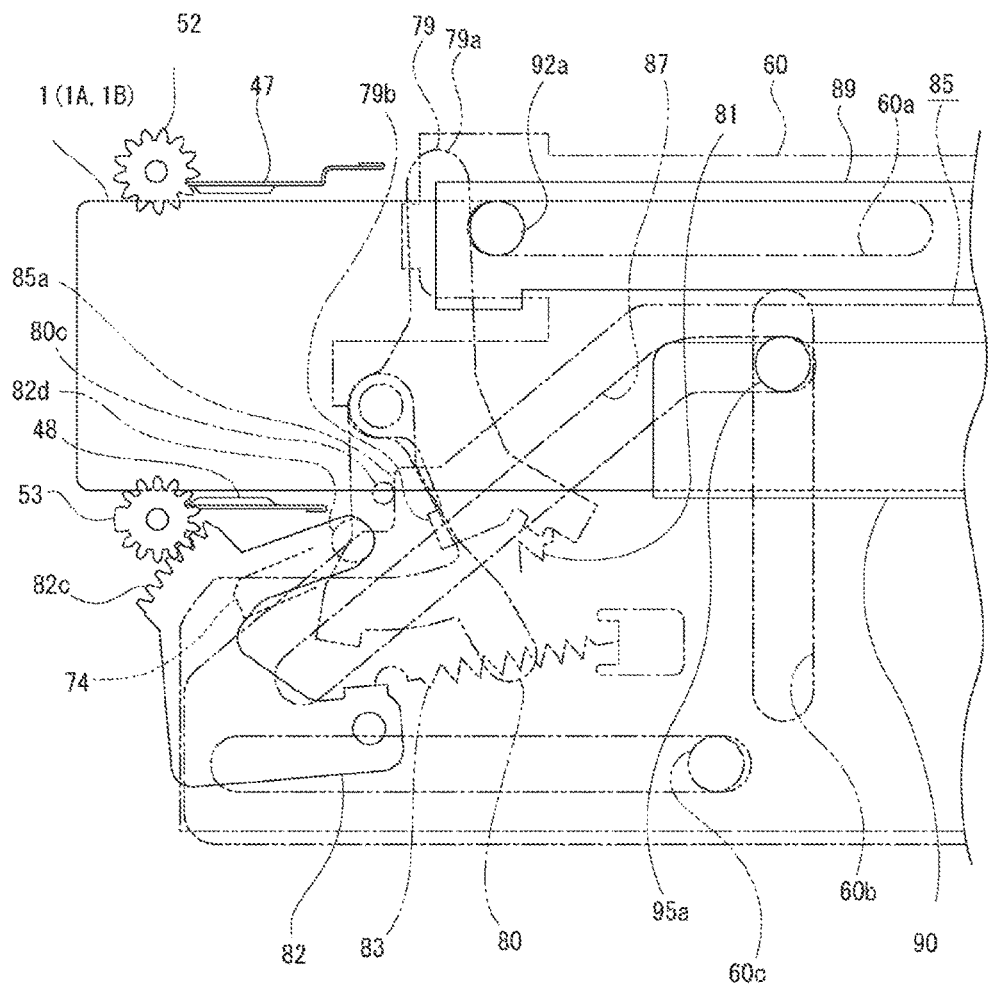
FIG. 26 A schematic enlarged side view showing a state where the upper holder is moved forward so that a part of the disk cartridge protrudes from a cartridge insertion/ejection port, following FIG. 25.

When the upper holder 89 is moved to the forward movement end, the to-be-operated protrusion portion 79a of the push arm 79 is pressed from behind by the guided pin 92a (see FIG. 26). Therefore, the push arm 79 is rotated in a direction in which the operation protrusion portion 79b is moved rearwardly against the bias force of the tension spring 81. By the push arm 79 being rotated, the operation protrusion portion 79b is set apart from the interlocking pin 82d of the gear arm 82.

At this time, since a part of the disk cartridge 1 protrudes forwardly from the cartridge insertion/ejection port 43a, the gear arm 82 biased by the spring member 83 is not rotated.

A user is capable of gripping the front end portion of the disk cartridge 1 protruding forwardly from the cartridge insertion/ejection port 43a and pulling out the disk cartridge 1 from the disk conveyor apparatus 40.

It should be noted that the pulling out of the disk cartridge 1 from the disk conveyor apparatus 40 may be carried out by gripping and pulling out grip portions 6a, 6a formed in the case body 2 by a disk grip mechanism (not shown). It is also possible to grip the grip portions 6a, 6a by the disk grip mechanism and insert the disk cartridge 1 into the disk conveyor apparatus 40.

In a state where the disk cartridge 1 is pulled out from the disk conveyor apparatus 40, the lock release protrusion portions 93a, 93a are respectively pulled out from the insertion holes 24a, 24a of the opening/closing panel 23, and the lock portions 14, 14 respectively engage with the first lock concave portions 29a, 29a of the second shell 4. At the same time, the pressing of the release pieces 92b, 92b with respect to the lock sliders 18, 18 is released, and the lock portions 20, 20 of the lock sliders 18, 18 respectively engage with the second lock concave portions 29b, 29b of the second shell 4. Therefore, the disk cartridge 1 is locked in a state where the first shell 3 and the second shell 4 are coupled to each other.

<Identification of Type of Disk Cartridge, Etc.>

Figure 27:
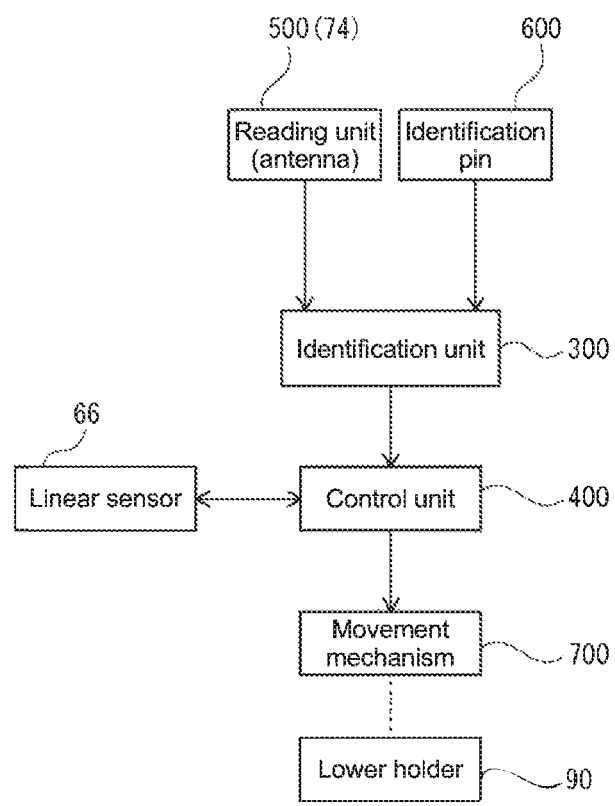
FIG. 27 A block diagram showing an example of a configuration including an identification unit and a control unit.

Hereinafter, an example of an identification of a type of the disk cartridge 1 or the like by an identification unit provided in the disk conveyor apparatus 40, or the like will be described (see FIG. 27).

The disk conveyor apparatus 40 includes an identification unit 300 that identifies the type of the disk cartridge 1 and a control unit 400 that controls a movement position of the lower holder 90.

The identification unit 300 identifies which of the disk cartridge 1A or the disk cartridge 1B the disk cartridge 1 is, on the basis of information stored in the information input sheet 31, that is read out by a reading unit 500 (antenna 74). Further, the identification unit 300 identifies which of the disk cartridge 1A or the disk cartridge 1B the disk cartridge 1 is, also on the basis of information related to an identification pin 600 that can be inserted into the identification hole of the disk cartridge 1.

Further, on the basis of information read out by the reading unit 500, the identification unit 300 also identifies specific information for specifying at least one of the disk-shaped recording media 100, 100, . . . stored in the disk cartridge 1. For example, the specific information is identified from information related to a remaining recordable capacity of each of the disk-shaped recording media 100, 100, . . . and is information for specifying the disk-shaped recording medium 100 onto which data is to be recorded by comparing a capacity of data to be recorded and the remaining recordable capacity of each of the disk-shaped recording media 100, 100, . . . . As a result, the disk-shaped recording medium 100 whose remaining capacity is equal to or larger than the capacity of data to be recorded, for example, an n-th disk-shaped recording medium 100 from the top, is specified.

Each piece of information identified by the identification unit 300 is input to the control unit 400, and the control unit 400 controls a movement mechanism 700 on the basis of each piece of input information. As described above, the movement mechanism 700 corresponds to the elevating motor 62, the intermediate gears 63, 64, and the like that move the lower holder 90 in the vertical direction.

The lower holder 90 is moved by the operation of the movement mechanism 700, and the specified n-th disk-shaped recording medium 100 is moved to a position where it can be inserted into the disk insertion portion 153 of the disk drive apparatus 150, for example. At this time, the detection result of the linear sensor 66 is input to the control unit 400, the movement mechanism 700 is controlled by the control unit 400 on the basis of the input detection result, and the lower holder 90 is identified by the identification unit 300 and moved to the set movement position.

As described above, the disk conveyor apparatus 40 includes the identification unit 300 that identifies the type of the disk cartridge 1 and the control unit 400 that controls the movement mechanism 700, and the movement position of the lower holder 90 is controlled by the control unit 400 on the basis of the identification result of the identification unit 300.

Therefore, since the movement mechanism 700 is operated under control of the control unit 400 based on the identification result of the identification unit 300, it is possible to reliably move the lower holder 90 to the set movement position in accordance with the type of the disk cartridge 1.

Further, the identification unit 300 identifies, in addition to the type of the disk cartridge 1, specific information for specifying at least one of the disk-shaped recording media 100, 100, . . . , and the control unit 400 controls the movement position of the lower holder 90 on the basis of the identification result of the identification unit 300.

Therefore, since the movement mechanism 700 is operated under control of the control unit 400 based on the identification result of the identification unit 300 including the specific information, the lower holder 90 can be more-reliably moved to the set movement position in accordance with the type of the disk cartridge 1.

CONCLUSION

As described above, in the disk conveyor apparatus 40, the disk holder 57 is capable of holding different types of disk cartridges 1 (disk cartridge 1A and disk cartridge 1B), and the movement mechanism is operated in accordance with the type of the disk cartridge 1 to set the movement position of the disk holder 57 (lower holder 90).

Therefore, since the setting of the movement position of the disk holder 57 is performed by the operation of the movement mechanism corresponding to the type of the disk cartridge 1 held by the disk holder 57, it becomes possible to handle different types of disk cartridges 1 in the disk conveyor apparatus 40 and improve general versatility related to the disk cartridge 1.

Further, since the type of the disk cartridge 1A and that of the disk cartridge 1B differ due to the difference in the number of disk-shaped recording media 100 to be accommodated, it is possible to set the movement position of the lower holder 90 by the operation of the movement mechanism in accordance with the disk cartridge 1 whose type differs on the basis of the difference in the numbers of disk-shaped recording media 100 to be accommodated, and move the disk-shaped recording medium 100 fed by the feeder mechanism to a position corresponding to the difference in the numbers of media to be accommodated.

It should be noted that the type of the disk cartridge 1A and that of the disk cartridge 1B may differ on the basis of a difference in thicknesses of the disk-shaped recording media 100, for example. In a case where the types of disk cartridges 1 differ on the basis of the difference in thickness of the disk-shaped recording media 100, the movement position of the lower holder 90 is set by the operation of the movement mechanism in accordance with the disk cartridge 1 whose type differs on the basis of the difference in thicknesses of the disk-shaped recording media 100. Therefore, the disk-shaped recording medium 100 fed by the feeder mechanism can be moved to a position corresponding to the thickness difference.

Further, the antenna 74 that reads out the type information stored in the information input sheet 31 of the disk cartridge 1 is provided, and the movement mechanism is operated on the basis of the type information read out by the antenna 74.

Therefore, since the movement position of the lower holder 90 is set on the basis of the read type information, the disk-shaped recording medium 100 fed by the feeder mechanism can be easily and accurately moved to a position corresponding to the type of the disk cartridge 1.

Furthermore, the disk conveyor apparatus 40 includes the rack gear 86 that functions as a linearly-moved driving member and the linear sensor 66 that detects the movement position of the rack gear 86, and the lower holder 90 is moved along with the movement of the rack gear 86 so that the movement position of the lower holder 90 is set on the basis of the detection result of the linear sensor 66.

Accordingly, since the movement position of the rack gear 86 is detected by the linear sensor 66 during the movement of the lower holder 90 accompanying the rack gear 86, it is possible to improve positioning accuracy regarding the movement position of the disk-shaped recording medium 100.

Further, the rack gear 86 is used as the driving member, and the linear sensor 66 includes the coupling pin 66b that functions as a coupling portion that is coupled with the rack gear 86 and moves along with the movement of the rack gear 86.

Therefore, since the coupling pin 66b of the linear sensor 66 is moved along with the rack gear 86, detection accuracy of the linear sensor 66 regarding the movement position of the rack gear 86 can be improved.

It should be noted that although the example where two disk cartridges 1A and 1B of different types are handled has been described in the descriptions above, the disk conveyor apparatus 40 may handle 3 or more disk cartridges of different types.

It should be noted that the present technology can also take the following configurations.

(1) A disk conveyor apparatus, including:
a disk holder that holds at least a part of a disk cartridge in which disk-shaped recording media are accommodated inside a case body in a state where the disk-shaped recording media are accommodated, and is moved in at least a direction of a center axis of the disk-shaped recording media;
a movement mechanism that causes the disk holder to move in the direction of the center axis of the disk-shaped recording media; and
a feeder mechanism that feeds the disk-shaped recording media toward a disk drive apparatus from the case body,
the disk holder being capable of holding different types of disk cartridges,
a movement position of the disk holder being set by operating the movement mechanism in accordance with the type of the disk cartridge.

(2) The disk conveyor apparatus according to (1), further including:
an identification unit that identifies the type of the disk cartridge; and
a control unit that controls the movement mechanism, in which
the control unit controls the movement position of the disk holder on a basis of an identification result of the identification unit.

(3) The disk conveyor apparatus according to (1), further including:
an identification unit that identifies the type of the disk cartridge and specific information for specifying at least one of the disk-shaped recording media accommodated in the disk cartridge; and
a control unit that controls the movement mechanism, in which
the control unit controls the movement position of the disk holder on a basis of an identification result of the identification unit.

(4) The disk conveyor apparatus according to any one of (1) to (3), in which
the feeder mechanism feeds the disk-shaped recording media toward the disk drive apparatus from the case body in a state where the disk holder is moved to the set movement position.

(5) The disk conveyor apparatus according to any one of (1) to (4), in which
the type of the disk cartridge is identified on a basis of a difference in a shape of the case body.

(6) The disk conveyor apparatus according to any one of (1) to (5), in which
the type of the disk cartridge is differentiated by a number of disk-shaped recording media to be accommodated.

(7) The disk conveyor apparatus according to any one of (1) to (5), in which
the type of the disk cartridge is differentiated by a difference in a thickness of the disk-shaped recording media.

(8) The disk conveyor apparatus according to any one of (1) to (7), in which
the disk cartridge includes an information storage unit that stores type information,
the disk conveyor apparatus further includes
a reading unit that reads out the type information stored in the information storage unit, and
the movement mechanism is operated on a basis of the type information read out by the reading unit.

(9) The disk conveyor apparatus according to any one of (1) to (8), further including
a bias spring that presses a part of the disk holder against the movement mechanism in one direction.

(10) The disk conveyor apparatus according to (9), in which
the one direction is an upward direction, and
the disk holder is moved downwardly toward the movement position in the state where the disk cartridge is held.

(11) The disk conveyor apparatus according to (9), in which
the one direction is a downward direction, and
the disk holder is moved upwardly toward the movement position in the state where the disk cartridge is held.

(12) The disk conveyor apparatus according to any one of (9) to (11), in which
a torsion coil spring is used as the bias spring.

(13) The disk conveyor apparatus according to any one of (1) to (12), further including:
a driving member that is moved linearly; and
a linear sensor that detects a movement position of the driving member,
in which
the disk holder is moved along with the movement of the driving member, and
the movement position of the disk holder is set on a basis of a detection result of the linear sensor.

(14) The disk conveyor apparatus according to (13), in which
a rack gear is used as the driving member, and
the linear sensor includes a coupling unit that is coupled with the rack gear and is moved along with a movement of the rack gear.

(15) The disk conveyor apparatus according to any one of (1) to (14), further including
a cam slider that slidably supports the disk holder, in which
the disk holder is moved by a movement of the cam slider, in a direction orthogonal to a movement direction of the cam slider.

(16) The disk conveyor apparatus according to (15), in which
a pair of cam sliders are respectively arranged on both sides of the disk holder, and
the disk conveyor apparatus further includes
a coupling frame that couples the pair of cam sliders.

REFERENCE SIGNS LIST 1 disk cartridge
2 case body 31 information input sheet (information storage unit)
40 disk conveyor apparatus
57 disk holder
66 linear sensor
66b coupling pin (coupling portion)
74 antenna (reading unit)
84 coupling frame
85 cam slider
86 rack gear
100 disk-shaped recording medium
300 identification unit
400 control unit
500 reading unit
700 movement mechanism

The invention claimed is:

1. A disk conveyor apparatus, comprising:
a disk holder that holds at least a part of a disk cartridge in which disk-shaped recording media are accommodated inside a case body in a state where the disk-shaped recording media are accommodated, and is moved in at least a direction of a center axis of the disk-shaped recording media;
a movement mechanism that causes the disk holder to move in the direction of the center axis of the disk-shaped recording media; and
a feeder mechanism that feeds the disk-shaped recording media toward a disk drive apparatus from the case body, wherein
the disk holder being capable of holding different types of disk cartridges, and
a movement position of the disk holder being set by operating the movement mechanism in accordance with a type of the disk cartridge of the different types of disk cartridges.

2. The disk conveyor apparatus according to claim 1, further comprising:
an identification unit that identifies the type of the disk cartridge; and
a control unit that controls the movement mechanism, wherein
the control unit controls the movement position of the disk holder on a basis of an identification result of the identification unit.

3. The disk conveyor apparatus according to claim 1, further comprising:
an identification unit that identifies the type of the disk cartridge and specific information for specifying at least one of the disk-shaped recording media accommodated in the disk cartridge; and
a control unit that controls the movement mechanism, wherein
the control unit controls the movement position of the disk holder on a basis of an identification result of the identification unit.

4. The disk conveyor apparatus according to claim 1, wherein
the feeder mechanism feeds the disk-shaped recording media toward the disk drive apparatus from the case body in a state where the disk holder is moved to the set movement position.

5. The disk conveyor apparatus according to claim 1, wherein
the type of the disk cartridge is identified on a basis of a difference in a shape of the case body.

6. The disk conveyor apparatus according to claim 1, wherein
the type of the disk cartridge is differentiated by a number of disk-shaped recording media to be accommodated.

7. The disk conveyor apparatus according to claim 1, wherein
the type of the disk cartridge is differentiated by a difference in a thickness of the disk-shaped recording media.

8. The disk conveyor apparatus according to claim 1, wherein
the disk cartridge includes an information storage unit that stores type information,
the disk conveyor apparatus further comprises
a reading unit that reads out the type information stored in the information storage unit, and
the movement mechanism is operated on a basis of the type information read out by the reading unit.

9. The disk conveyor apparatus according to claim 1, further comprising
a bias spring that presses a part of the disk holder against the movement mechanism in one direction.

10. The disk conveyor apparatus according to claim 9, wherein
the one direction is an upward direction, and
the disk holder is moved downwardly toward the movement position in the state where the disk cartridge is held.

11. The disk conveyor apparatus according to claim 9, wherein
the one direction is a downward direction, and
the disk holder is moved upwardly toward the movement position in the state where the disk cartridge is held.

12. The disk conveyor apparatus according to claim 9, wherein
a torsion coil spring is used as the bias spring.

13. The disk conveyor apparatus according to claim 1, further comprising:
a driving member that is moved linearly; and
a linear sensor that detects a movement position of the driving member,
wherein
the disk holder is moved along with the movement of the driving member, and
the movement position of the disk holder is set on a basis of a detection result of the linear sensor.

14. The disk conveyor apparatus according to claim 13, wherein
a rack gear is used as the driving member, and
the linear sensor includes a coupling unit that is coupled with the rack gear and is moved along with a movement of the rack gear.

15. The disk conveyor apparatus according to claim 1, further comprising
a cam slider that slidably supports the disk holder, wherein
the disk holder is moved by a movement of the cam slider, in a direction orthogonal to a movement direction of the cam slider.

16. The disk conveyor apparatus according to claim 15, wherein
a pair of cam sliders are respectively arranged on both sides of the disk holder, and
the disk conveyor apparatus further comprises
a coupling frame that couples the pair of cam sliders.

* * * * *